United States Patent
Skiba et al.

(10) Patent No.: US 10,425,363 B2
(45) Date of Patent: Sep. 24, 2019

(54) SOCIAL MESSAGING HOLD AND WAIT TREATMENT SYSTEMS

(71) Applicant: AVAYA INC, Santa Clara, CA (US)

(72) Inventors: David Skiba, Golden, CO (US); Reinhard Klemm, Basking Ridge, NJ (US); Patrick Tendick, Basking Ridge, NJ (US); George W. Erhart, Loveland, CO (US); Wen-Hua Ju, Monmouth Junction, NJ (US)

(73) Assignee: Avaya Inc., Santa Clara, CA (US)

( * ) Notice: Subject to any disclaimer, the term of this patent is extended or adjusted under 35 U.S.C. 154(b) by 185 days.

(21) Appl. No.: 15/289,736

(22) Filed: Oct. 10, 2016

(65) Prior Publication Data

US 2018/0103149 A1  Apr. 12, 2018

(51) Int. Cl.
  *H04L 12/58* (2006.01)
  *H04M 3/42* (2006.01)
  *H04M 3/428* (2006.01)
  *H04M 3/527* (2006.01)

(52) U.S. Cl.
  CPC .............. *H04L 51/02* (2013.01); *H04L 51/16* (2013.01); *H04M 3/4285* (2013.01); *H04M 3/42382* (2013.01); *H04M 3/527* (2013.01); *H04M 3/42221* (2013.01); *H04M 2201/40* (2013.01); *H04M 2203/558* (2013.01); *H04M 2203/655* (2013.01)

(58) Field of Classification Search
  CPC ....... H04M 2203/55; H04M 2203/551; H04M 3/5183; H04M 3/5191; H04M 2203/655

USPC .............. 379/265.09, 266.1, 265.05, 265.01, 379/265.11
See application file for complete search history.

(56) References Cited

U.S. PATENT DOCUMENTS

| | | | |
|---|---|---|---|
| 7,035,927 B2 | 4/2006 | Flockhart et al. | |
| 8,675,861 B2 | 3/2014 | Matteo | |
| 8,964,962 B1* | 2/2015 | Skiba | H04M 3/5183 379/265.09 |
| 9,118,764 B2 | 8/2015 | Mistry | |
| 2009/0270067 A1* | 10/2009 | Johnson | H04M 1/274566 455/405 |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2013/0223608 A1 | 8/2013 | Flockhart et al. | |

OTHER PUBLICATIONS

U.S. Appl. No. 15/285,091, dated Oct. 4, 2016, Skiba et al.
U.S. Appl. No. 15/285,160, dated Oct. 4, 2016, Skiba et al.

* cited by examiner

*Primary Examiner* — Thjuan K Addy
(74) *Attorney, Agent, or Firm* — Sheridan Ross P.C.

(57) ABSTRACT

Systems are provided to manage pauses, including on-hold, conditions in communications, such as text-based communications. Users may be provided with messages at a pace that, among other things, allows a particular cadence of messages to be maintained, even if a reply has been created. Accordingly, resources of a contact center may be better allocated to other matters requiring attention without causing undue customer dissatisfaction or the burden of handling additional messages. While voice-based "hold" conditions may be managed with messages or music on hold, text-based communications may be managed with social messaging content and/or comfort messages.

20 Claims, 16 Drawing Sheets

SOCIAL MESSAGING HOLD AND WAIT TREATMENT SYSTEMS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods related to message exchanged over a communication network and particularly to monitoring and processing such messages.

BACKGROUND

There is an increasing reliance on channels such as web chat, social media, text, and messaging to provide customer care between a customer and an agent of a contact center or company. These channels are proving to be convenient and efficient and facilitate customer care for the benefit of both the customer and the company. As more time is spent getting service over these channels, users can become frustrated when progress takes longer than expected and/or customers get routed to other agents or departments. These are known as "hold" situations in the voice world. In the text world, the "hold" situations only provide silence.

Another issue occurs as the use of non-voice/non-real-time channels continue to grow and the optimization of agent time similarly continues to increase in importance. Prior art optimization of agent time is performed by requiring agents to take on multiple non-voice interactions such as Short Message Service (SMS), email, text, social media, social messaging, etc. An agent may be responsible for juggling as many of these interactions as the agent is able and/or the agent's manager configures for the agent. The pace of one or more conversations is determined by how attentive the agent is to a customer and how quickly the interaction can be handled. However, other optimization may be often overlooked, such as in addressing a specific customer interaction.

Another issue common in the prior art occurs with the increase in customer care delivered over web chat, social media, text, and messaging. These channels are proving to be convenient and efficient channels for customer care benefiting both the customer and the company. However, providing status, progress, and comfort without disrupting the content-bearing part of the conversation. Recording and storing the entirety of a conversation, including non-content messages, wastes storage and processing resources and renders transcriptions more cumbersome and less useful.

SUMMARY

These and other needs are addressed by the various embodiments and configurations of the present invention.

The present invention can provide a number of advantages depending on the particular configuration. These and other advantages will be apparent from the disclosure of the invention(s) contained herein.

In one embodiment, systems and methods are provided to provide social messaging hold and wait treatment.

In another embodiment, systems and methods are disclosed to provide the optimization of an appropriate or optimal rate of response or interaction with a particular customer. In addition, the absence in the prior art of a measurement of the impact of pace choices on customer satisfaction are provided and managed. Accordingly, and in one embodiment, pace normalization for omni-channel interactions is provided to determine and set appropriate response intervals, and allowing agents to handle omni-channel interactions appropriately.

In another embodiment, systems and methods are disclosed to provide social messaging hold and wait treatment for customers, such as while waiting on agents, waiting in queue, and during transfers.

In another embodiment, systems and methods are disclosed to provide pace normalization for omni-channel interactions. The system may develop tolerances (in time intervals) through testing individuals and/or groups. Tolerances may be tested multiple times and set or reset at any time by a supervisor or administrator.

In another embodiment, comfort messages with decay are inserted that update all parties on status and are identified and removed/deleted to preserve transcription space and resources.

In another embodiment, systems and methods are provided for the insertion of comfort messages in text-based interactions to maintain normal conversation cadence while keeping both sides updated on progress. The comfort messages are provided with decay so that the comfort messages may be deleted and not included in a transcription and/or subsequent processing.

In another embodiment, systems and automatic methods are provided for "social messaging hold." Social media hold may be invoked when the agent has a "hold" button that is available to use in situations where they need time to find some information, waiting on a process to complete, or any other "hold" situation. Social messaging hold may also be invoked when sessions are transferred to other agents, queues, or departments or automatically when a customer is placed in queue.

The functionality of the "social messaging hold" goes beyond music on hold, well known in the prior art for voice-based communications. Social messaging hold leverages a wide range of features of a social messaging channel to deliver text, images, video, interactive surveys, interactive games, advertising, and other multi-modal entertainment options based on the given channel.

When a visitor, such as a customer, is put on "social messaging hold," the choice is for generic and/or context hold. Generic hold may be a series of advertising, company based messages, or an interactive news ticker with clickable stories. An experience is delivered to the customer through the social messaging channel. The customer can choose to interact with the hold experience, watch it, listen to it, silence it, etc.

The context hold can deliver personalized content based on previous hold interactions, customer profile, and other preferences preselected and/or selected by the user. If the conversation originates in a social media channel, the system may initiate and perform a customer social media context analysis. Then, based on the customer context analysis, "social hold" can display age/gender/culture/region-appropriate content, emphasize content that is compatible with the customer's preferences and likes as determined in the context analysis, and exclude content that promotes products/services that the customer has complained about or ranted against previously. When the agent returns, the customer is done in queue, and/or transfer completes, the session can resume as normal.

Another embodiment implements an "I'm back" feature can be implemented which enables the customer to tell the agent to wait. If the customer was in the middle of reading an article or finishing a game, the customer can finish and then return to the session. In another option, the customer can send the hold content to an alternate channel or return to the hold content if the social messaging platform can allow historical interactive content.

Social messaging hold may be applied to the session at any point or at multiple points in the session. The application of which may occur while the customer is in queue, while the customer is on hold for a transfer, and when an agent initiates application for performing longer tasks, etc. Social messaging hold may be called multiple times during a single session. In this operation, the previous hold activities may be continued (valuable because of the context features and potential input) and/or new activities may be initiated and saved.

For example, Bob is waiting in "social messaging hold" for a banking agent to talk about getting credit for a late payment fee. While on hold, he is shown the interactive on hold advertisement for mortgage refinance based on the bank's knowledge of his history and accounts and likelihood of qualification. Bob starts to click for more information on the offer, entering some application information. He is interrupted by the agent to deal with his late payment fee. The on-hold interaction is saved in the stream for him to return to later. If he doesn't, the bank can initiate another interaction with Bob to finish the application over the web, chat, or social messaging.

In one embodiment, a measure of how responsive an agent has to be in any channel type to keep a visitor engaged without dissatisfaction. Factors to determine an acceptable delay may include how much time is needed for the agent to multitask on multiple interactions while avoiding "spamming" a visitor with unneeded comfort messages.

In another embodiment, an expectation of response time can vary from channel to channel. Voice channels have a very near real-time response requirement (if you don't acknowledge what the visitor said within N milliseconds, they will repeat themselves). On the other extreme, e-mail may have a multi-day, more lenient response time expectation. The social channels lie in-between the two extremes.

In another embodiment, the measurement and tracking of response time intervals are provided to determine what response interval can be tolerated on a specific channel without loss of transaction satisfaction. Analysis can also be done on a channel/visitor basis if a sufficient number of transactions are available.

In one embodiment: a default response interval is selected (e.g., one minute). Next, the metering of responses to visitor requests in that interval are provided. If the visitor sends messages indicating that they think the system is not responding to their input, the interval is reduced. If the visitor does not send unsolicited messages when nothing has been sent back to them in the current response interval, then add some increment to the response interval (e.g., five seconds). This may be repeated until the maximum response interval is found that does not elicit impatient messages from the visitor.

When applied globally, the interval can be selected at the desired service satisfaction levels across all measured tolerated response intervals (meaning, if the goal is 80% satisfaction, then the chosen default interval would be expressed as the 80% percentile across all measured intervals). If applied to individual satisfaction levels, it would be the measured interval for the specific visitor.

Using this method, satisfaction can be maintained while determining the optimal interval. This would allow agents to manage multiple sessions with different response interval requirements.

For example, Facebook Messenger visitors might need response intervals of 1 minute where Twitter Direct Messaging (DM) users might tolerate response intervals of 3 minutes. This can vary by business type and response intervals may be set accordingly.

The system may also delay sending an agent response according to the designated response interval. This would have the effect of "dragging out" or pacing the conversation but would free up the agent to multi-task on additional conversations while training the customer's expectations. Since the response interval is learned/derived from the customer, the response rate still allows a satisfying conversation.

A new class of message, comfort message, is provided, such as for use in chat, social, text, and messaging conversations. The new message may be sent as a normal message but has a decay factor associated with the normal message. The comfort messages help to keep a normal conversation cadence while keeping both sides updated on progress.

During the course of a text interaction session, a user may choose to send a comfort message to keep the customer updated (e.g., "I'm checking your order status now" or "It will be one more minute"). This may be done by sender choice or it may be automated through an indication to the sender that this message has no content-bearing information and can be sent as a comfort message. The decay factor can also be set at a message level or a system level. The decay factor indicates the length of time, message depth, or other feature of when the message should decay/disappear from the display.

The comfort message may be sent, and behaves, like any other message to the receiver. The comfort message is in the timeline and can be responded to like normal. Next, the decay is executed based on the set decay factor which can be time, message depth, etc. When the factor is reached, the comfort message will be removed from the timeline or deleted, allowing a clean concise conversation to be maintained with all of the standard information-bearing messages remaining intact.

Without decay messages:
Bob: Is my flight delayed?
Automation: Please send me your flight number or frequent flyer number.
Bob: I don't have that information.
Automation: Ok, thanks.
Automation: Let me transfer you to the next available agent.
Bob: ok
Automation: An agent should be available in 3 minutes.
Bob: sure
Automation: I will transfer you to Cindy to help you.
Bob: ok
Cindy: Hi Bob, I can help you with your flight delay.
Bob: thanks.
Cindy: Do you have your ticket number? Or what city are you flying to/from?
Bob: I am on a flight from Denver to Newark.
Cindy: ok thanks, let me look that up.
Bob: ok Cindy: found it.
Cindy: yes, flight 458 to Newark is delayed 2 hours. It will now leave from gate 47.
Bob: ok thanks. I will go over there.
Cindy: Is there anything else I can help you with?
Bob: no, that's all.
Cindy: have a nice day.
Bob: ok, thanks.
Decay messages identified "-->"
Bob: Is my flight delayed?
Automation: Please send me your flight number or frequent flyer number.
Bob: I don't have that information.
-->Automation: Ok, thanks.
-->Automation: Let me transfer you to the next available agent.
-->Bob: ok
-->Automation: An agent should be available in 3 minutes.
-->Bob: sure
-->Automation: I will transfer you to Cindy to help you.
-->Bob: ok
Cindy: Hi Bob, I can help you with your flight delay.
-->Bob: thanks.
Cindy: Do you have your ticket number? Or what city are you flying to/from?
Bob: I am on a flight from Denver to Newark.
-->Cindy: ok thanks, let me look that up.
-->Bob: ok
-->Cindy: found it.
Cindy: yes, flight 458 to Newark is delayed 2 hours. It will now leave from gate 47.
Bob: ok thanks. I will go over there.
Cindy: Is there anything else I can help you with?
Bob: no, that's all.
Cindy: have a nice day.
-->Bob: ok, thanks.
Preserved Final Transcript (after comfort messages have been removed):
Bob: Is my flight delayed?
Automation: Please send me your flight number or frequent flyer number.
Bob: I don't have that information.
Cindy: Hi Bob, I can help you with your flight delay.
Cindy: Do you have your ticket number? Or what city are you flying to/from?
Bob: I am on a flight from Denver to Newark.
Cindy: yes, flight 458 to Newark is delayed 2 hours. It will now leave from gate 47.
Bob: ok thanks. I will go over there.
Cindy: Is there anything else I can help you with?
Bob: no, that's all.
Cindy: have a nice day.

In one embodiment, a system is disclosed comprising: a storage device; and a processor to: access a communication between a customer of a contact center and a first agent of the contact center and wherein the communication is associated with a work item of the contact center, wherein the communication comprises a plurality of messages; identify at least one of the plurality of messages is a comfort message devoid of content related to the work item; and cause the data storage device to maintain a transcription of the communication absent the comfort message.

In another embodiment, a method is disclosed comprising: accessing, by a processor, a communication between a customer of a contact center and a first agent of the contact center and wherein the communication is associated with a work item of the contact center, wherein the communication comprises a plurality of messages; identifying, by the processor, at least one of the plurality of messages is a comfort message devoid of content related to the work item; and causing, by the processor, the data storage device to maintain a transcription of the communication absent the comfort message.

In another embodiment another system is disclosed, comprising: means to access, by a processor, a communication between a customer of a contact center and a first agent of the contact center and wherein the communication is associated with a work item of the contact center, wherein the communication comprises a plurality of messages; means to identify, by a processor, at least one of the plurality of messages is a comfort message devoid of content related to the work item; and means to cause, by the processor, the data storage device to maintain a transcription of the communication absent the comfort message.

Other embodiments disclosed include:

A system, comprising:
a network interface; and
a processor, connected to the network interface, to:
  access a communication between a customer of a contact center and an agent of the contact center and wherein the communication is associated with a work item of the contact center, wherein the communication comprises a plurality of messages;
  receive a most recent message from the customer, the most recent message comprising one of the plurality of messages that was last received and warrants a response from the contact center;
  access a pace normalization value previously determined to be an acceptable delay in responding to the most recent message;
  receive an indication that the agent has submitted a reply message comprising one of the plurality of messages; and
  hold the reply message until a period of time has lapsed, the period of time beginning from receipt of the most recent message, and the period of time is at least the pace normalization value and, after which, transmit the reply message.

The system, wherein the processor further performs:
setting the pace normalization value, comprising,
accessing a target satisfaction rate;
at a prior time, before the communication, accessing number of prior communications between prior customers and prior agents and wherein the prior communications are associated with prior work items of the contact center, wherein the communication comprises a plurality of prior messages;
setting the pace normalization value to an initial value;
observing an observed satisfaction rate, the observed satisfaction rate being determined by a portion the number of prior customers satisfied with the pace normalization value to the quantity of the number of prior customers; and
upon determining a modification to the pace normalization value would place the observed satisfaction rate to be more similar to the target satisfaction rate, applying the modification to the pace normalization rate.

The system, wherein determining satisfaction comprises determining a lack of dissatisfaction.

The system, wherein the communication is a text-based communication.

A method, comprising:
accessing, by a processor, a communication between a customer of a contact center and an agent of the contact center and wherein the communication is associated with a work item of the contact center, wherein the communication comprises a plurality of messages;

receiving, by the processor, a most recent message from the customer, the most recent message comprising one of the plurality of messages that was last received and warrants a response from the contact center;

accessing, by the processor, a pace normalization value previously determined to be an acceptable delay in responding to the most recent message;

receiving, by the processor, an indication that the agent has submitted a reply message comprising one of the plurality of messages; and holding the reply message until a period of time has lapsed, the period of time beginning from receipt of the most recent message, and the period of time is at least the pace normalization value and, after which, transmitting, by the processor via a network interface, the reply message.

The method, wherein transmitting the reply message, further comprises receiving, by the processor, a signal from the agent to transmit the reply message.

The method, further comprising:
prior to receiving the indication that the agent has submitted the reply message, presenting the agent with indicia of an amount of the period of time remaining.

The method, further comprising, prior to receiving the indication that the agent has submitted the reply message, prompting the agent to address another work item, different from the work item.

The method, further comprising, selecting the another work item from a pool of work items having an estimated time to respond substantially equivalent to the period of time.

The method, further comprising:
setting the pace normalization value, comprising,
accessing a target satisfaction rate;
at a prior time, before the communication, accessing number of prior communications between prior customers and prior agents and wherein the prior communications are associated with prior work items of the contact center, wherein the communication comprises a plurality of prior messages;
setting the pace normalization value to an initial value;
observing an observed satisfaction rate, the observed satisfaction rate being determined by a portion the number of prior customers satisfied with the pace normalization value to the quantity of the number of prior customers; and
upon determining a modification to the pace normalization value would place the observed satisfaction rate to be more similar to the target satisfaction rate, applying the modification to the pace normalization rate.

A system, comprising:
a network interface;
a processor to:
receive a signal from an agent device, associated with an agent, indicating that a communication between the agent and a customer is to be put on hold, wherein the communication comprises a plurality of text-based messages associated with a work item of the contact center;
signaling a customer communication device, utilized by the customer for the communication, to present a hold session provided by the processor; and
receiving an off-hold signal from the agent and, in response thereto, signaling the customer communication device to terminate the hold session.

The system of claim 1, wherein terminating the hold session further comprises saving the hold session.

The system, further comprising, in response to a prompt from the customer communication device, accessing the saved hold session, and resuming the hold session.

The system, wherein the prompt comprises a signal that the communication has ended.

The system, wherein the hold session comprises elements retrieved by the processor from a networked data source.

The system, wherein the hold session comprises elements retrieved by the processor from a private data source and further comprises a customer-specific data element.

The system, wherein the hold session comprises one or more of games, news, marketing information, or entertainment content.

The system, wherein the processor, upon receiving the off-hold signal, determines a current state of the hold session as being in an uninterruptible state and, delays signaling the customer communication device to terminate the hold session when in the uninterruptible state.

The system, wherein the hold session has at least one break-point which may be associated with a point in the hold session that, if interrupted by the continuation of the communication, could readily be resumed by the customer.

The system, wherein the break-point comprises at least one of, section-break of an article of text, level completion of a game, form submission, text entry submission, completion of a media file presentation, completion of a bookmarked media file presentation, or interactive content paused by the customer.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a sub-element identifier when a sub-element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
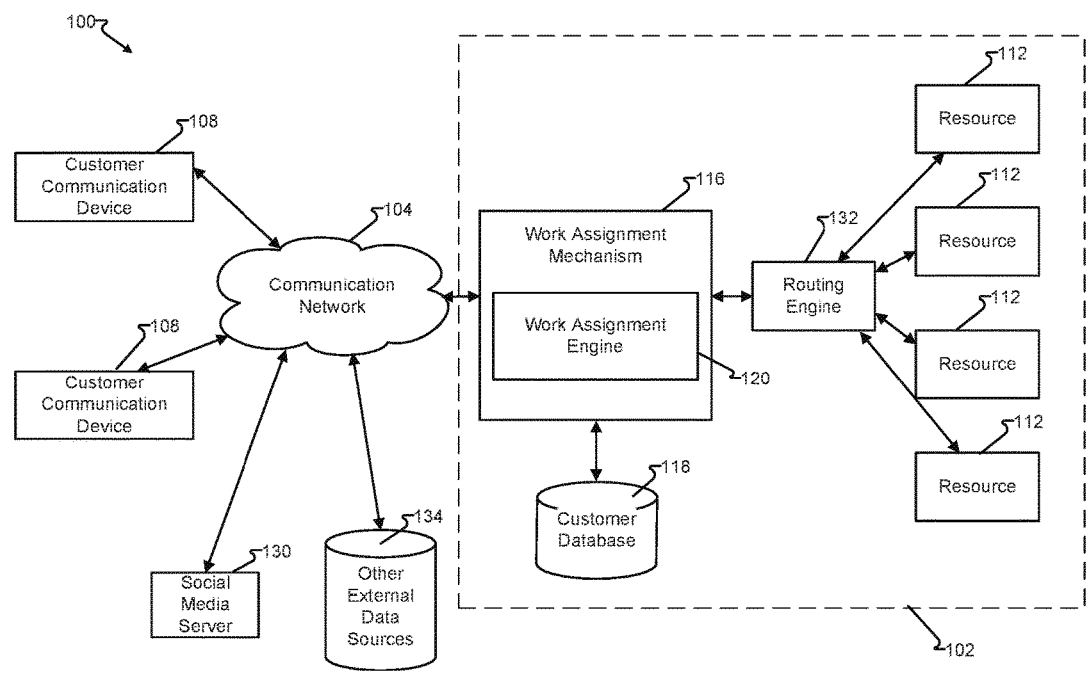
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., Wi-Fi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
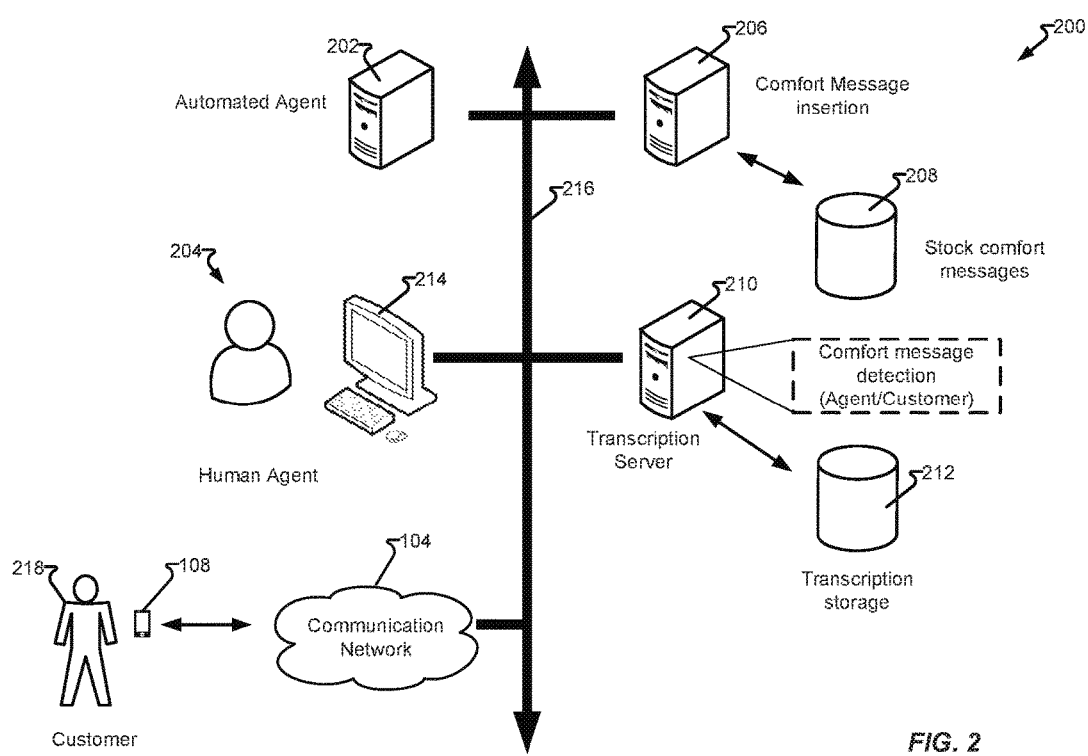
FIG. 2 depicts a second system in accordance with embodiments of the present disclosure.

FIG. 2 depicts system 200 in accordance with embodiments of the present disclosure. In one embodiment, customer 218 utilizes customer communication device 108 to conduct a text-based communication with resource 112, such as human agent 204 with communication device 214 and/or automated agent 202. The communication may be originated by customer 218 or contact center 102 to perform a work item of contact center 102. The work item being to gather or provide information related to a purpose of contact center 102. For example, if contact center 102 is associated with an airline, the propose of contact center 102 is related to flying passengers and/or cargo and the related activities (e.g., booking tickets; answering questions about flight availability, taking payments, resolving complaints, providing ancillary travel services, etc.). In another example, contact center 102 is associated with a retailer and, therefore, the purpose of contact center 102 is related to retailing (e.g., taking orders, answering product/service questions, processing returns, marketing additional/new products/services, etc.). However, the communication may comprise a message lulls such as when a work item is waiting to be assigned to an agent, information is not readily available, an agent is researching an issue or obtaining permission for an action, or other activities whereby communication is suspended. When the communication is audio, music on hold or other audio information may be provided that, at least, informs customer 218 that the connection is still active. Comfort messages are provided to provide assurance to customer 218 that the communication has not been abandoned. In other embodiments, the comfort message may provide additional information and/or amusement, including, but not limited to jokes, news, marketing information, time until a non-comfort message is anticipated, etc. Unfortunately, storage and subsequent access is unnecessarily burdened by maintaining comfort messages.

Another agent (e.g., a different resource 112) may receive the communication transcript, such as to provide a skill or authority, not possessed by human agent 204. Another agent may be a supervisor, quality control, compliance, or other administrative agent accessing the communication transcript, during or after the communication has completed. Maintaining comfort messages in transcript storage 212 wastes space and places an additional burden on one or more of network 216 and/or 104, human agent 204, and/or automated agent 202. Accordingly, and in one embodiment, at least one processor, such as one operating transcription server 210 causes transcription storage 212 to store messages of the communication absent comfort messages. In another embodiment, transcription server 210 causes transcription storage 212 to store messages of the communication, including comfort messages, but with an associated "decay." The "decay" provides for the automatic removal of comfort messages, such as upon an event (e.g., passage of a previously determined amount of time, change of topic within the communication, termination of the communication, etc.).

The insertion of comfort messages into a communication is variously embodied. In one embodiment, human agent 204 may type, or speak for speech-to-text conversion, the comfort message utilizing communication device 214. In another embodiment, comfort message insertion server 206 may determine a lull in the conversation has occurred and prompt human agent 204 to provide a comfort message, suggest a comfort message for human agent 204 to provide, such as by retrieving a comfort message from stock comfort messages database 208, or automatically insert the comfort message into the communication. Automated agent 202 may directly request a comfort message from comfort message insertion server 206 or directly generate or access a comfort message from stock comfort messages database 208.

In another embodiment, transcription server 210 may determine a message is a comfort message. For example, a message may be expressly provided with an indicia of a comfort message, comfort message insertion server 206 may signal transcription server 210 in accordance with the inserting of a comfort message, and/or transcription server 210 may determine a message has no content related to the domain of a work item and/or the contact center. For example, the purpose of a work item associated with a communication may be to provide a checking account balance in response to a request by customer 218. Due to a system delay, a communication between customer 218 and human agent 204 may comprise a message comprising solely non-banking domain content (e.g., sports, weather, etc.). Transcription server 210 may determine that the message is devoid of banking domain content and, therefore a comfort message, and cause transcription server 212 to omit the comfort message or to store the comfort message with decay, whereby the comfort message is deleted following an event.

Transcription server 210 may be configured to determine a message is a comfort message that originates solely from human agent 204, or other component of contact center 102. In another embodiment, detecting comfort messages originating from customer communication device 108 is also contemplated. For example, customer 218 may be performing an operation time consuming task on another device (e.g., loading software on a personal computer, running a diagnostic program, etc.) and, prompted or unprompted, provide comfort messages (e.g., "still working," "up to 34% now," etc.) and, accordingly, have such comfort messages not saved or "decay" and removed upon the occurrence of an event. The event, such as the passage of time, leading to the removal of customer provided comfort messages may be the same or different from the event associated with the removal of comfort messages provided by components or personnel of contact center 102.

While certain storage and processing advantages may be realized by entirely removing and/or not storing comfort messages in transcription storage 212, in other embodiments, an indicia of the comfort message is stored and/or stored separately from domain-containing messages. The indicia may be maintained indefinitely or have a decay associated therewith. For example, comfort messages may be automatically provided by comfort message insertion server 206 obtaining comfort messages from stock comfort messages database 208 and have an associated indicia, such as record number or hash. The indicia may be provided within a transcript and/or the comfort message or indicia may be provided in a distinct storage location. A more complete discussion of less-than-all maintenance of comfort messages is provided below, such as with respect to FIGS. 4 and 5.

It should be appreciated by one of ordinary skill in the art that the functionality of the components described with respect to system 200 may be implemented in different configurations without departing from the scope of the disclosure. For example, additional, fewer, and/or combinations components may implement the functions of any one or more of automated agent 202, comfort message insertion server 206, transcription server 210, communication device 214, stock comfort messages database 208, and transcription storage 212, as well as the components of contact center 102, including but not limited to work assignment mechanism 116, work assignment engine 120, customer database 118, and/or routing engine 132, and/or other component of contact center 102. Additionally, the components provided in system 200 may be embodied as discrete hardware devices connected by network 216 and/or communications network 104 or processes executing on discrete, distributed, shared, combined, and/or virtual (e.g., "cloud") components. While the embodiments disclosed herein are described with respect to text (e.g., Short Message Service (SMS), Instant Messaging (IM), etc.), in other embodiments, other text based communications (e.g., social media posts/chat, email, etc.) may be utilized. In yet another embodiment, transcribed or audio voice messages may be utilized, wherein an audio, or speech-to-text transmission, comfort message may decay and be omitted from or removed form transcription storage 212.

Figure 3:
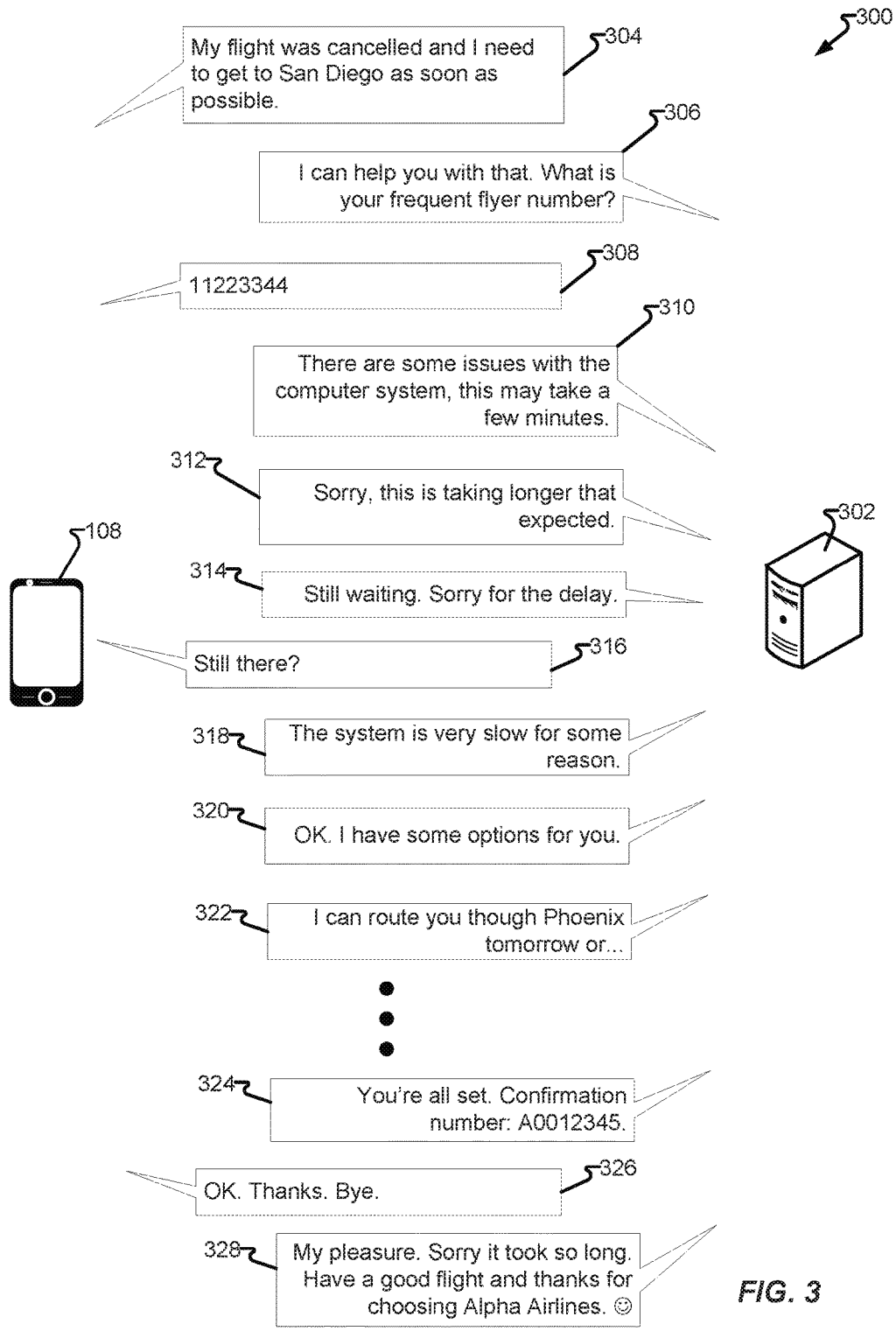
FIG. 3. depicts a communication in accordance with embodiments of the present disclosure.

FIG. 3. depicts communication 300 in accordance with embodiments of the present disclosure. In one embodiment, a communication between customer 218, utilizing customer communication device 108, and server 302. Server 302 may provide communication connectivity to a network (e.g., network 216 and/or communication network 104) as a standalone communication server or may comprise, or be comprised by, one or more of communication device 214, automated agent 202, comfort message insertion server 206, or other component of contact center 102.

Communication 300 comprises messages 304-328, provided by server 302 and customer communication device 108. Messages 304-328 comprise domain content, associated with a work item, and comfort messages. More specifically, messages 310, 312, 314, 316, 318, 326 provide no domain content and are provided to maintain the cadence of communication 300, and may be identified as comfort messages. Messages 316 and 326 may optionally be excluded from consideration as a comfort message as they originate from customer communication device 108.

Figure 4:
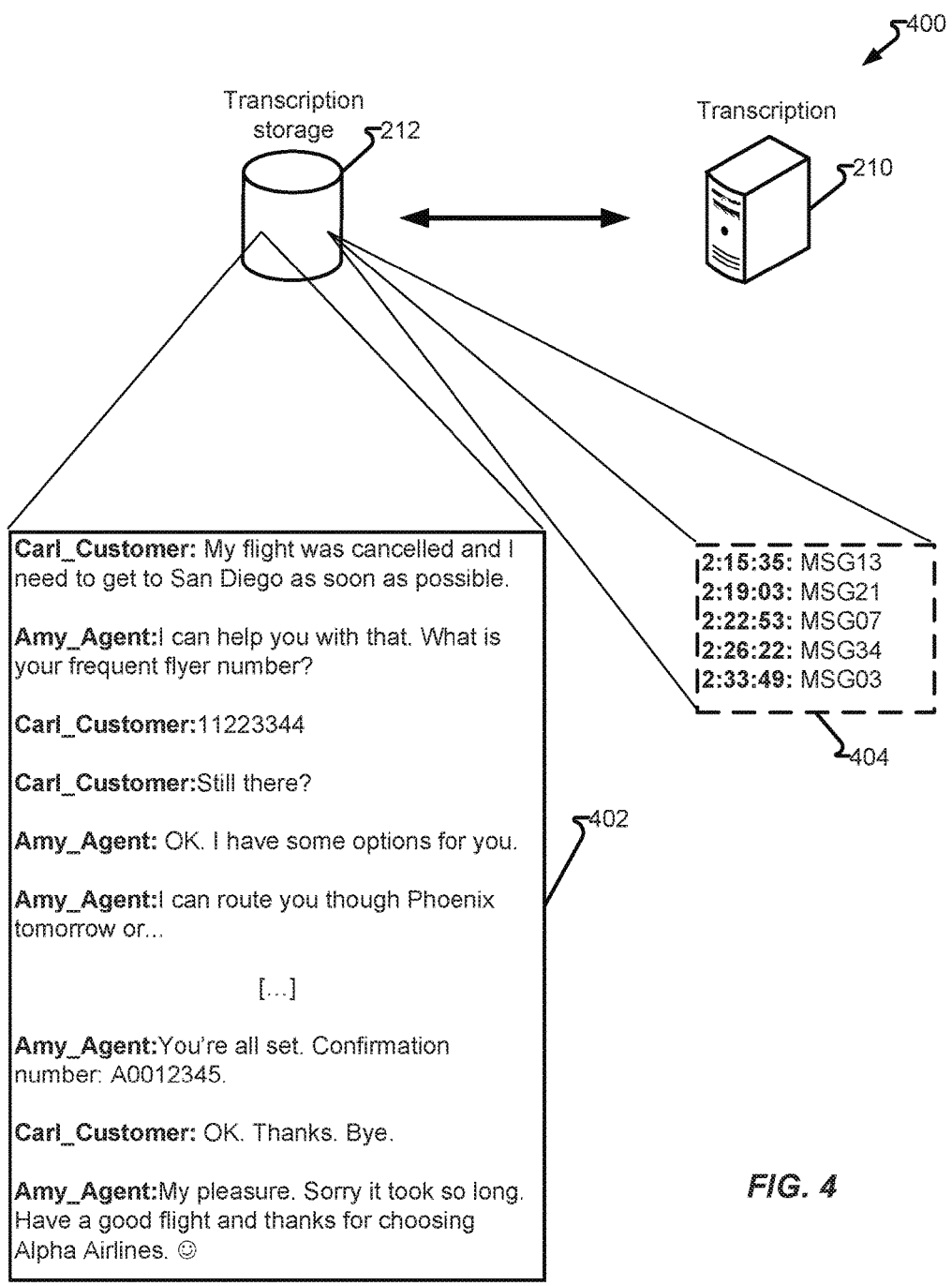
FIG. 4 depicts a third system in accordance with embodiments of the present disclosure.

FIG. 4 depicts system 400 in accordance with embodiments of the present disclosure. In one embodiment, transcription server 210 causes transcription storage 212 to store transcription 402 of communication 300 absent messages identified as comfort messages. In another embodiment, transcription server 210 causes transcription storage 212 to store transcription 402 of communication 300, including messages identified as comfort messages, but to decay and be removed upon the occurrence of an event.

In another embodiment, indicia of comfort messages 404 may be maintained. For example, comfort messages may have an index or other indicia, such as with stock comfort messages database 208. For example, message 314 may have an indicia (e.g., "MSG21") which may be stored within transcript 402 or maintain separately in indicia of comfort messages 404. Review of transcript 402, may be facilitated by the incorporation of indicia of comfort messages 404 and/or the associated text. For example, prior to the decay event, a second agent may receive the work item associated with transcript 402 and access transcript 402. The second agent may be presented with, or selectively determine, whether the presentation of transcript 402 omits comfort messages entirely, presents indicia of the comfort messages, and/or presents the text associated with indicia of the comfort messages.

In yet another embodiment, individual indicia of a comfort message or the indicia for a plurality or all comfort messages 404 may decay, and be deleted, upon the occurrence of a previously determined event. In a further embodiment, the decay for at least one indicia of a comfort message may be the same or different than the decay associated with a particular comfort message text.

Figure 5:
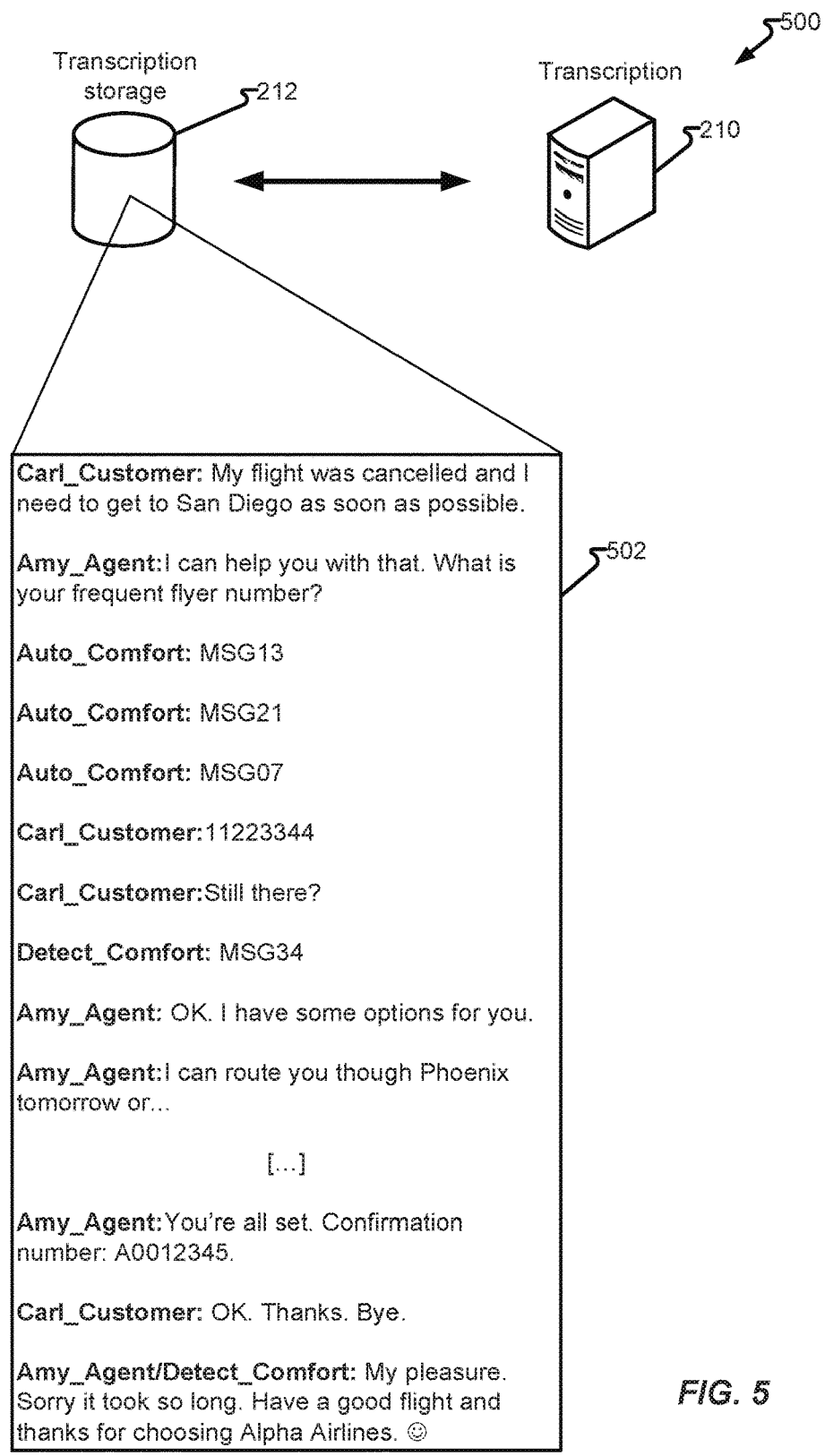
FIG. 5 depicts a fourth system in accordance with embodiments of the present disclosure.

FIG. 5 depicts system 500 in accordance with embodiments of the present disclosure. In one embodiment, transcript 502 comprises indicia of comfort messages, such as when an index or another identifier is known or determined. Transcript 502 may maintain the indicia of comfort messages and decay upon a previously determined event and be removed.

It should be appreciated that indicia of a comfort message may be provided to represent at least one of where a comfort message appears in a communication and/or the content of the comfort message. For example, one indicia may be a special text or character that applies to all comfort messages (e.g., "CM," "#," "X," etc.), classifications of comfort messages (e.g., "Waiting," "CM_wait," "Waiting.Extended," etc.), specific comfort messages (e.g., "MSG123," "Waiting.31," etc.), a placement of a comfort message (e.g., "CM_timestamp: 1:15:59; 2:36:22"), and/or a combination thereof. In yet another embodiment, comfort messages, and their associated indicia, may be concatenated. For example, "Sorry for the delay. The system is experiencing unusually high demand," may comprise two different comfort messages, such as may be generated or maintained in stock comfort messages database 208 and concatenated by comfort message insertion 206. The concatenated comfort messages may be treated as a single comfort message or as component comfort messages. Comfort messages, indicia, and/or concatenated comfort messages may have specific decay rates associated therewith. For example, "I need to ask my supervisor. This may take a few minutes," may be maintained longer (or shorter) than, "Please wait," as a matter of implementation choice.

Figure 6:
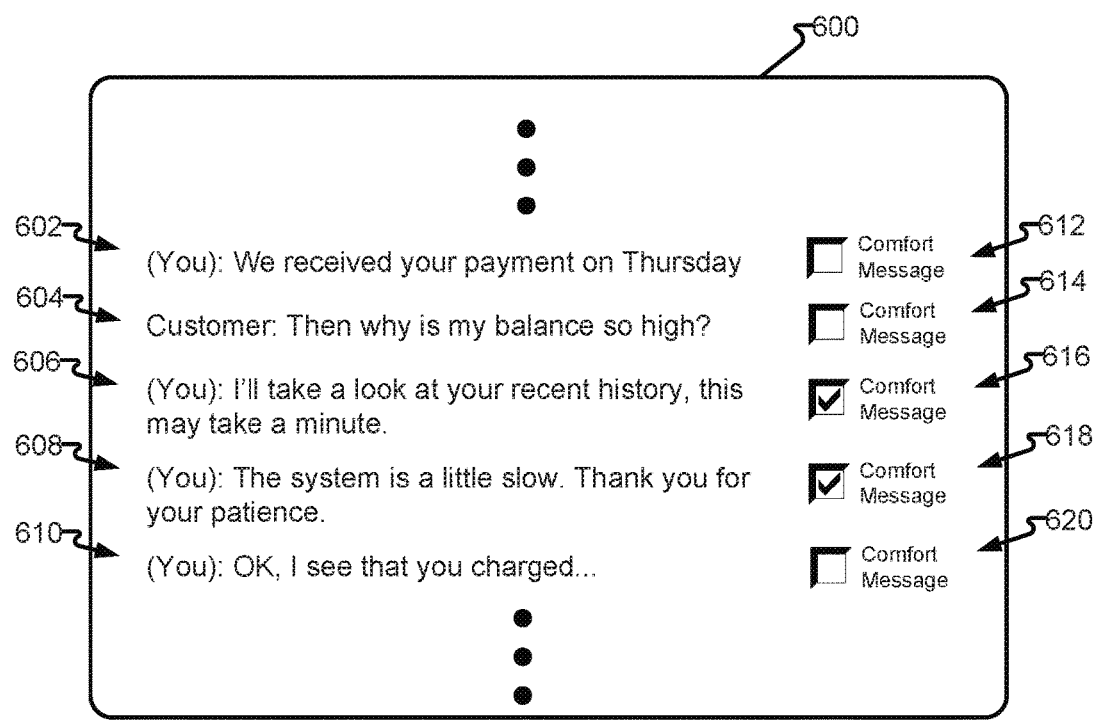
FIG. 6 depicts a first interface in accordance with embodiments of the present disclosure.

FIG. 6 depicts interface 600 in accordance with embodiments of the present disclosure. In one embodiment, comfort messages are automatically inserted, such as by automated agent 202, comfort message insertion 206, stock comfort messages database 208, or a combination thereof. In another embodiment, comfort messages are provided by human agent 204 and determined to be comfort messages, such as by transcription server 210. In another embodiment, human agent 204 may utilize communication device 214 for communicating with a customer, the communication comprising messages 602, 604, 606, 608, and 610. Human agent 204 may manually set one or more indicators 612, 614, 616, 618, 620 to indicate the message is a comfort message.

In another embodiment, indicia of a comfort message is, or is determined by, the settings of the one or more indicators 612, 614, 616, 618, 620. Accordingly, transcription server 210 may omit the storage of, or decay stored messages, having an indicator set associated with a comfort message, such as indicator 616 and 618 of interface 600. In a further embodiment, interface 600 may provide a suggested or default indicator for accepting or overriding by human agent 204 or another cue or recommendation to assist human agent 204 in determining which messages are comfort messages.

Figure 7:
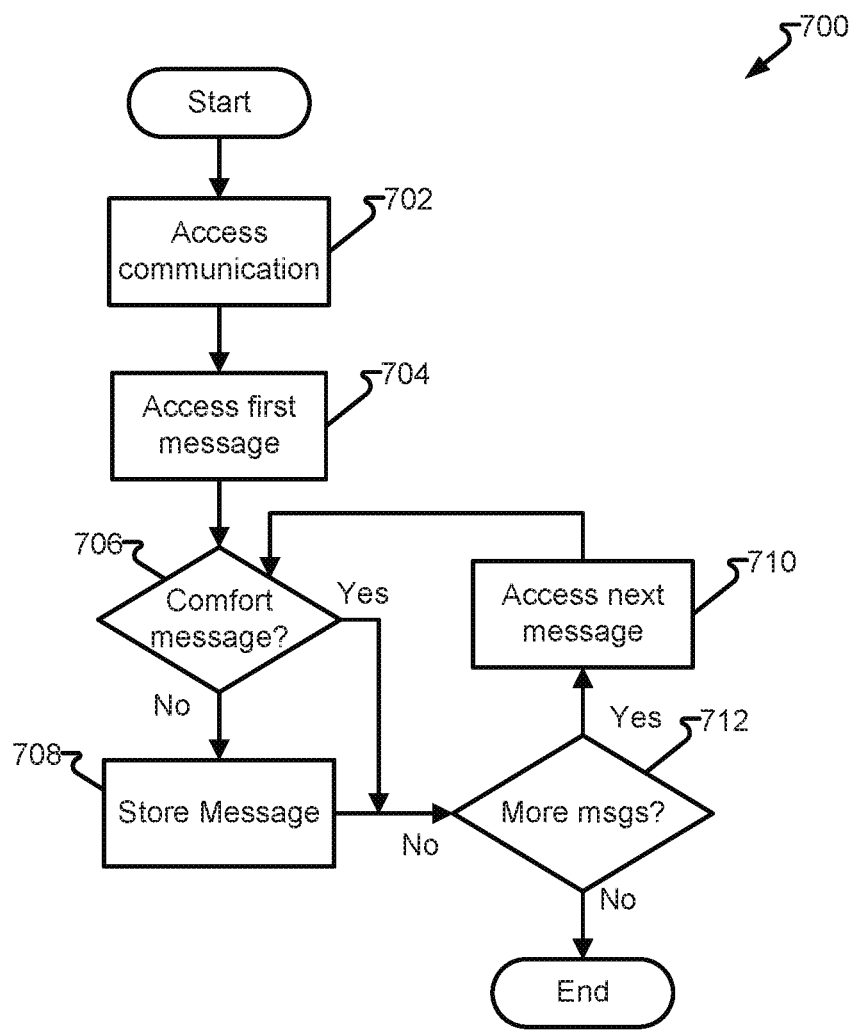
FIG. 7 depicts a first process in accordance with embodiments of the present disclosure.

FIG. 7 depicts process 700 in accordance with embodiments of the present disclosure. Process 700 may be executed by a server, such as transcription server 210 having access to a communication, between a resource 112, such as human agent 204 utilizing communication device 214 and/or automated agent 202. Messages of a communication that are determined to be comfort messages may be omitted from storage, such as within transcription storage 212. As a benefit, the storage required as well as processing resources may be reduced as comfort messages do not need to be maintained or analyzed.

In one embodiment, process 700 begins and step 702 accesses a communication. Step 702 may comprise accessing an in-progress communication or a concluded communication. Next, step 704 accesses a first message of the communication and step 706 determines if the message is a comfort message. If step 706 is determined in the negative, step 708 stores the message, such as in transcription storage 212. Following step 708, if executed, or if step 706 is determined in the affirmative, step 712 determines if there are more messages. If step 712 is determined in the affirmative, step 710 accesses the next message and process 700 continues at step 706. If step 712 is determined in the negative, process 700 may terminate or, optionally, restart at step 702 for another communication.

Figure 8:
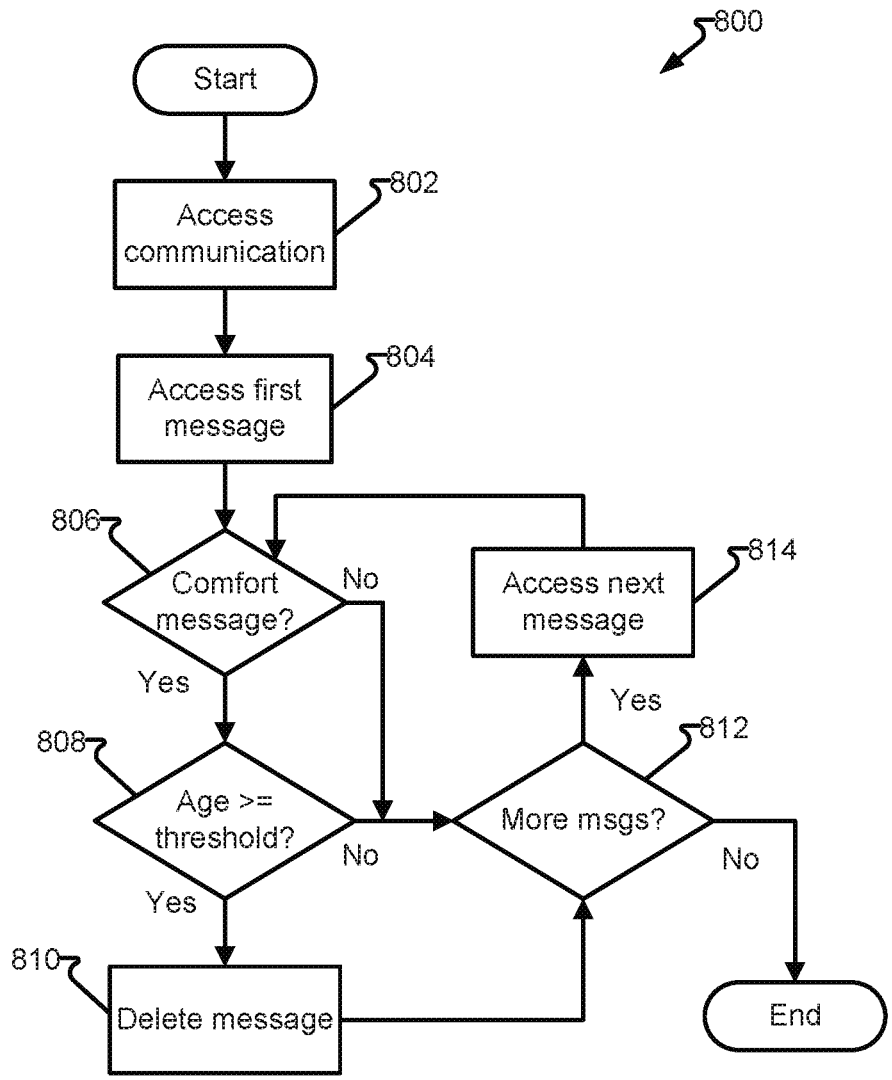
FIG. 8 depicts a second process in accordance with embodiments of the present disclosure.

FIG. 8 depicts process 800 in accordance with embodiments of the present disclosure. Process 700 may be executed by a server, such as transcription server 210 having access to a communication, between a resource 112, such as human agent 204 utilizing communication device 214 and/or automated agent 202. Messages of a communication that are determined to be comfort messages may be stored, such as within transcription storage 212, and removed. As a benefit, the storage required as well as processing resources may be reduced as comfort messages do not need to be maintained or analyzed.

In one embodiment, process 800 begins and step 802 accesses a communication maintained in a storage, such as transcription storage 212. Next, step 804 accesses a first message of the communication and step 806 determines if the message is a comfort message. If step 806 is determined in the affirmative, step 808 determines if the age of the message is equal to or greater than a previously determined threshold age and/or another event has occurred determinate of whether a comfort message has decayed. If step 808 is determined in the affirmative, step 810 causes the message to be deleted. Following the execution of step 810, step 806 when determined in the negative, or step 808 when determined in the negative, step 812 determines if there are more messages. If step 812 is determined in the affirmative, step 812 accesses the next message and process 800 continues with step 806. If step 812 is determined in the negative, process 800 may terminate or restart at step 802 with another communication.

Figure 9:
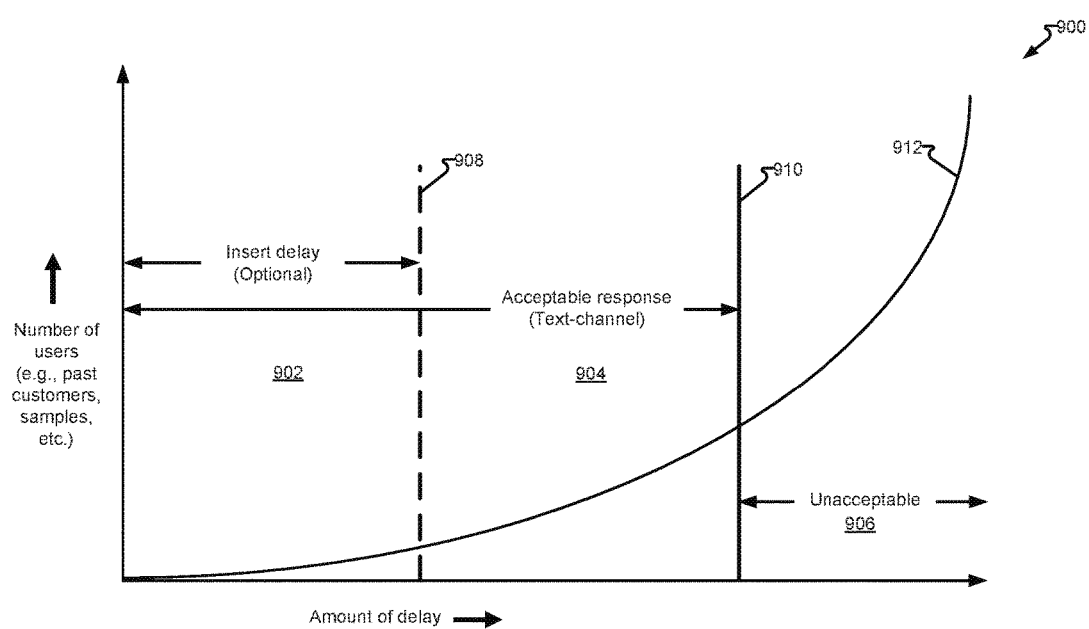
FIG. 9 depicts a graph in accordance with embodiments of the present disclosure.

FIG. 9 depicts graph 900 in accordance with embodiments of the present disclosure. In one embodiment, a threshold response rate is provided for one or more customers of a contact center and provides an indication of the time, after which, customer become dissatisfied unless the customer has received a response to a message sent by the customer to contact center 102. The threshold response rate may be a statistical value (e.g., a reply after a period of time in which 85% of customers are satisfied, or at least not dissatisfied, with the rate of response.).

As introduced above, a statistical determination may be utilized for a previously determined acceptable/unacceptable delineation provided by past customers, survey replies, or other means to gauge opinion for a population and/or sample determined to reasonably predict the reaction of customers of contact center 102. An acceptable or unacceptable response rate is determined, in part, by the medium utilized. For example, a customer may be having a real-time communication, such as by speaking with an agent via telephone, VoIP, etc. Upon not hearing a response of any kind, the customer may only wait a few seconds before attempting to ascertain the state of the communication or presence/understanding of the agent (e.g., "Did you get that?" "Are you still there?" etc.). A text-based communication will likely have a longer threshold, and an email may have an even longer threshold.

In one embodiment, curve 912 plots users, such as past customers, population samples, etc., and their level of dissatisfaction as the amounts of delay before a reply is received following the user's most recent message. Graph 900 may be relatively short for voice calls, for example, curve 912 may become asymptotic within ten or twenty seconds. For text messages, curve 912 may become asymptotic within a few minutes. For email, curve 912 may become asymptotic within several hours or days.

Contact center 102 may assign an agent, such as one of resources 112, to process a number of different work items on a variety of channels and mediums. In one embodiment, an agent that responds within timeframe 902 may be too quick. While the customer may, or may not, appreciate the response, such as whether the response is a comfort message or a substantive, domain containing message. However, such a rapid response may cause other work items to be neglected. For example, an agent that responds to a text message within timeframe 902 may have been otherwise able to respond to an email or another work item. The lack of response to the other work item may be associated with another curve 912 and cause the response to the other work item to be pushed back to timeframe 904 or 906. Or, regardless of whether any work items were subject to an unacceptable delay, responding to a work item within timeframe 904 may be an indication that the agent can take on additional work items and/or contact center 102 is overstaffed.

A response provided to the customer during timeframe 904, such as to afford the agent an opportunity to address another work item, was not associated with customer dissatisfaction and, as a benefit, the other work item was addressed. By responding prior to customer dissatisfaction, such as during timeframe 906, and optionally after a response is not necessarily expected, such as during timeframe 902, a reduced burden on processing, network, and storage resources may be realized as compared to a response within timeframe 902 that causes another work item to remain unaddressed and enqueued. Additionally, customers receiving responses within timeframe 902 may be less thoughtful or precise in their messages, resulting in superfluous and potentially erroneous or unclear messages that must be received, routed, stored, queued, processed, and otherwise tax the resources of contact center 102. It should be appreciated that while area 904 comprises area 902, embodiments where area 904 and area 902 are distinct are also contemplated herein.

Should the agent provide a reply to the customer during timeframe 902, optionally, a component of contact center 102 (e.g., work assignment mechanism 116, routing engine 132, server 302, and/or other server or system) may delay sending the reply, such as until event 908 occurs and timeframe 904 begins. As a result, a customer may be conditioned to expect responses within timeframe 904, even when a response is available, and may have been provided by an agent, during timeframe 902. As another benefit, the customer may, during the current or subsequent communication, not expect responses during timeframe 902—which, may be possible at one point in time, but not possible at another time.

In another embodiment, a threshold 910 is determined to be a limit of the acceptable amount of delay, after which, in timeframe 906, a response delay is unacceptable and before, in areas 902 and/or 904, a response delay is acceptable. Threshold 910 may be variously determined. For example, an initial value of threshold 910 may be set, which maybe based upon prior observations or arbitrary amounts, such as 1 minute, 1 hour, etc. Customers who express dissatisfaction or concern, such as by sending a follow-up message (e.g., "Are you still there?" "Was that clear?" "Did you get my last message?" etc.) may indicate unacceptability for a particular customer or customers. Contact center 102 may not be able to accommodate all customers' preferences. For example, some customers may have unrealistic expectations and expect a response in near real-time, even for text messages or emails. Accordingly, contact center 102 may determine threshold 910 in accordance with business objectives, such as to provide responses at a rate that is acceptable to a previously determined number, percentage, or ratio of customers. The relative position of threshold 910 and curve 912 may be determined, at least in part, on the medium, topic, user demographic, service level agreement, urgency, content of the communication, subject of the communication, volume of content in a previous message of the communication, rate of past responses, and/or other factor as may be selected as a matter of design or implementation choice.

In another embodiment, the position of threshold 910 may be refined over time. For example, threshold 910 may be temporarily pushed to the right, wherein the amount of delay is increased. If such a move is followed by receipt of customer inquiries (e.g., "Still there?"), then threshold 910 may be moved back to the left to shorten area 904.

Figure 10:
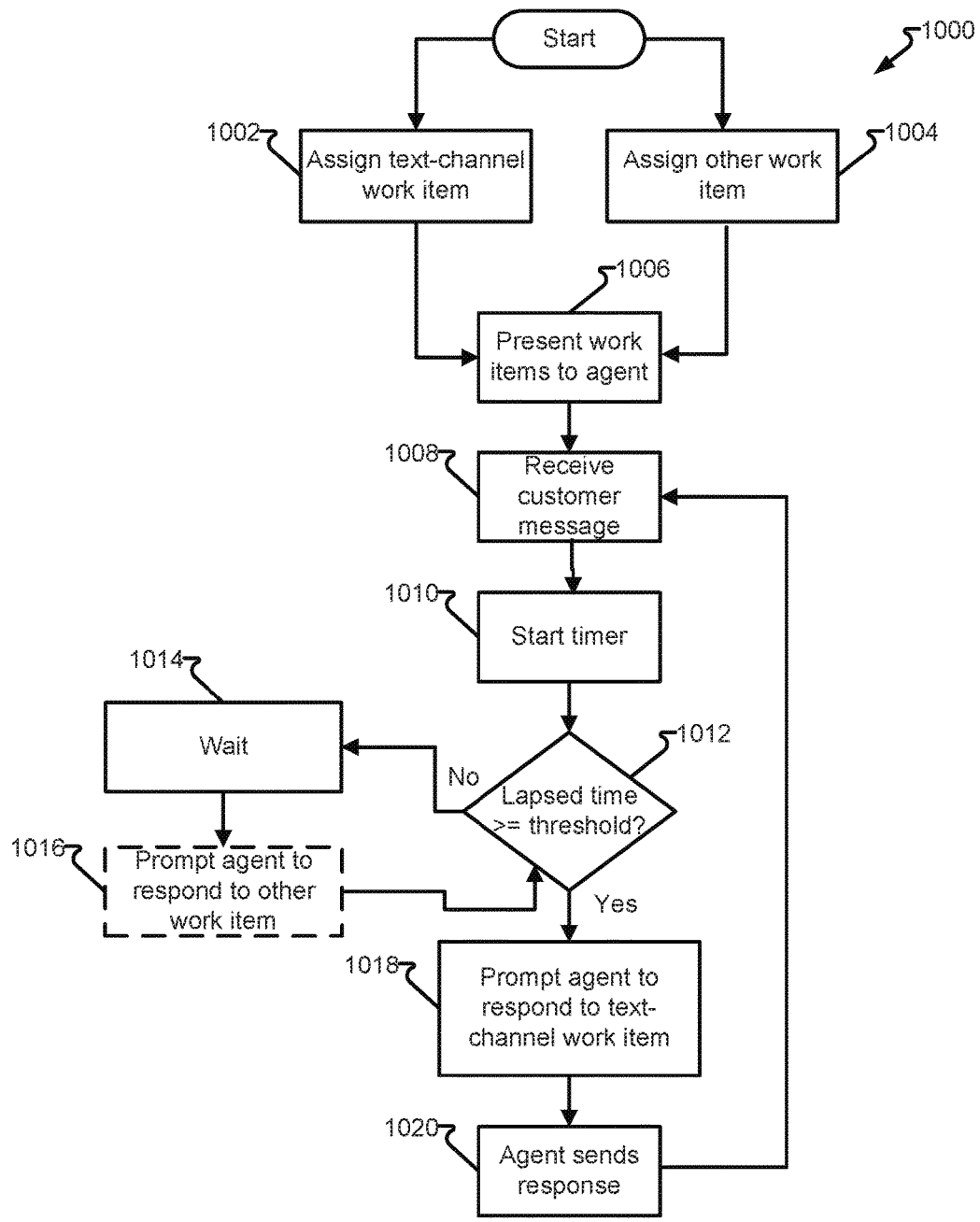
FIG. 10 depicts a third process in accordance with embodiments of the present disclosure.

FIG. 10 depicts process 1000 in accordance with embodiments of the present disclosure. While benefits may be realized by embodiments wherein only the text-channel work item is contemplated, additional benefits are provided when additional work items are assigned to the agent and certain trade-offs or compromises must be made to address all work items in a timely manner. In one embodiment, step 1002 assigns a text-channel work item to an agent. In another embodiment, step 1004 assigns another work item to the agent. Step 1006 presents work items to the agent. As a component of a communication, step 1008 receives a message from a customer.

Next, step 1010 starts a timer associated with when the message was received at step 1008. It should be appreciated that other techniques, such as examining a timestamp of message received as compared to a current time, time-based sorting, and other techniques known in the computing arts may be utilized in addition to, or as an alternative to, a timer. Next, step 1012 determines if the lapsed time is greater than, or alternatively, greater than or equal to, a threshold, such as threshold 908.

Figure 11:
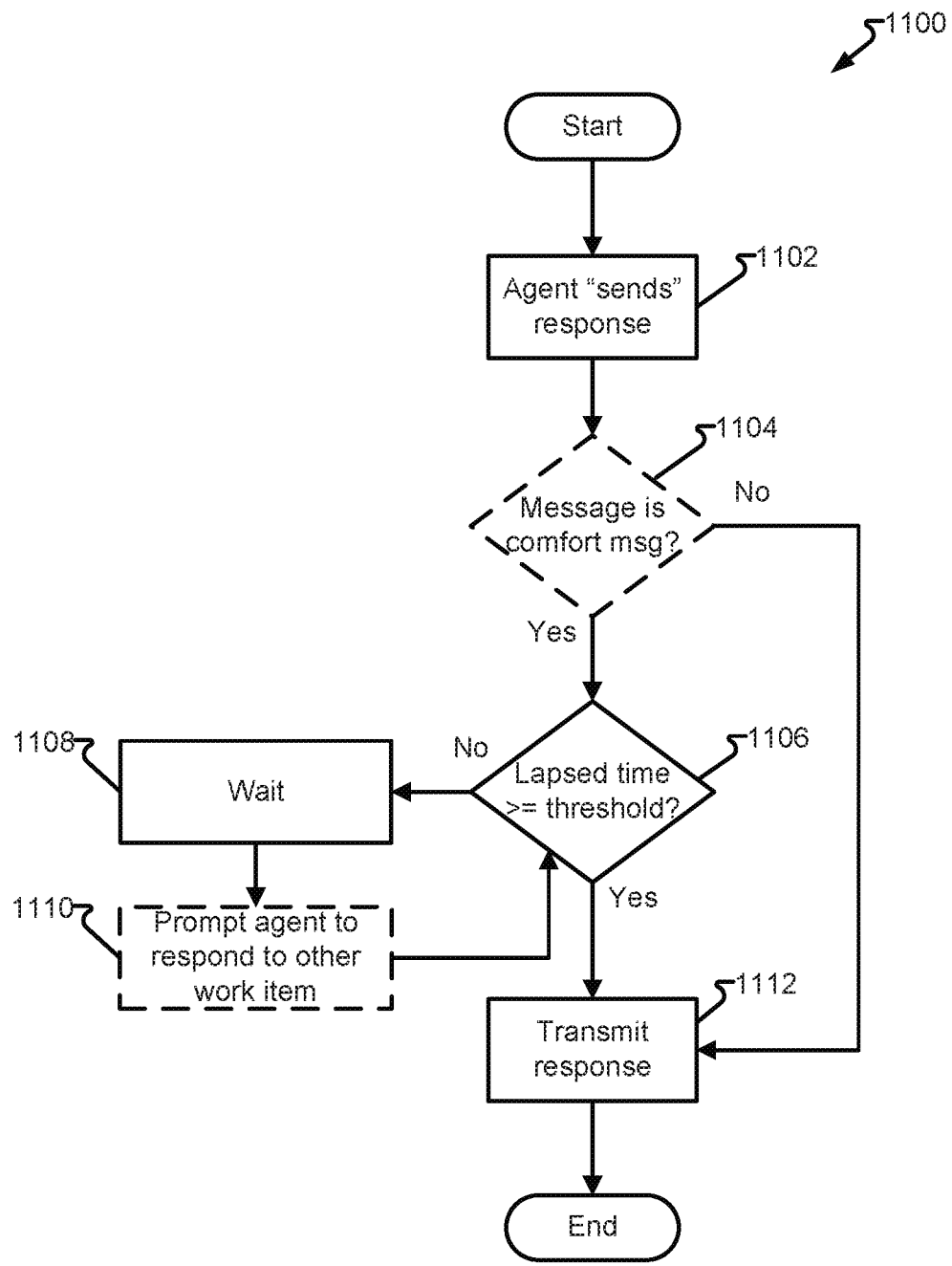
FIG. 11 depicts a fourth process in accordance with embodiments of the present disclosure.

If step 1012 is determined in the negative, step 1014 may be executed to insert a delay. Optionally, step 1016 may be provided to prompt the agent to attend to another work item, such as the other work item received in step 1004. Process 1000 returns to step 1012 and repeats until such time as step 1012 is determined in the affirmative. Step 1018 then prompts the agent to respond to the text-channel work item, such as the work item received in step 1002, after which, step 1020 sends the response from the agent to the customer. Process 1000 may then continue back to step 1008 upon receipt of another message. Process 1000 may terminate (not shown) upon the communication concluding, such as when no subsequent execution of step 1008 is provided. Process 1000 may restart with the subsequent performance of step 1002 and/or step 1004 associated with another work item or items FIG. 11 depicts a process 1100 in accordance with embodiments of the present disclosure. In one embodiment, an agent sends a response to a customer as a part of a work item in step 1102, however, the message is held. The response may appear to have been sent to the agent or the agent may be aware that the message is being held.

Next, optional step 1104 determines if the work item is a comfort message (e.g., "Please wait," "Got it," "Please give me a few minutes," etc.) devoid of domain content. If step 1104 is determine din the negative, process 1100 may proceed to step 1112 whereby the message is transmitted. If step 1104 is not implemented, or if implemented step 1104 is determined in the affirmative, step 1106 is executed to determine if the lapsed time is greater, or optionally greater than or equal to, a previously determined threshold, such as threshold 908.

If step 1106 is determined in the negative, step 1108 executes a delay and, optionally, step 1110 prompts the agent to respond to another work item, process 1100 then loops back to step 1106 until such time as step 1106 is determined in the affirmative. Once step 1106 is determined in the affirmative, step 1112 transmits the response "sent" by the agent in step 1102.

Figure 12:
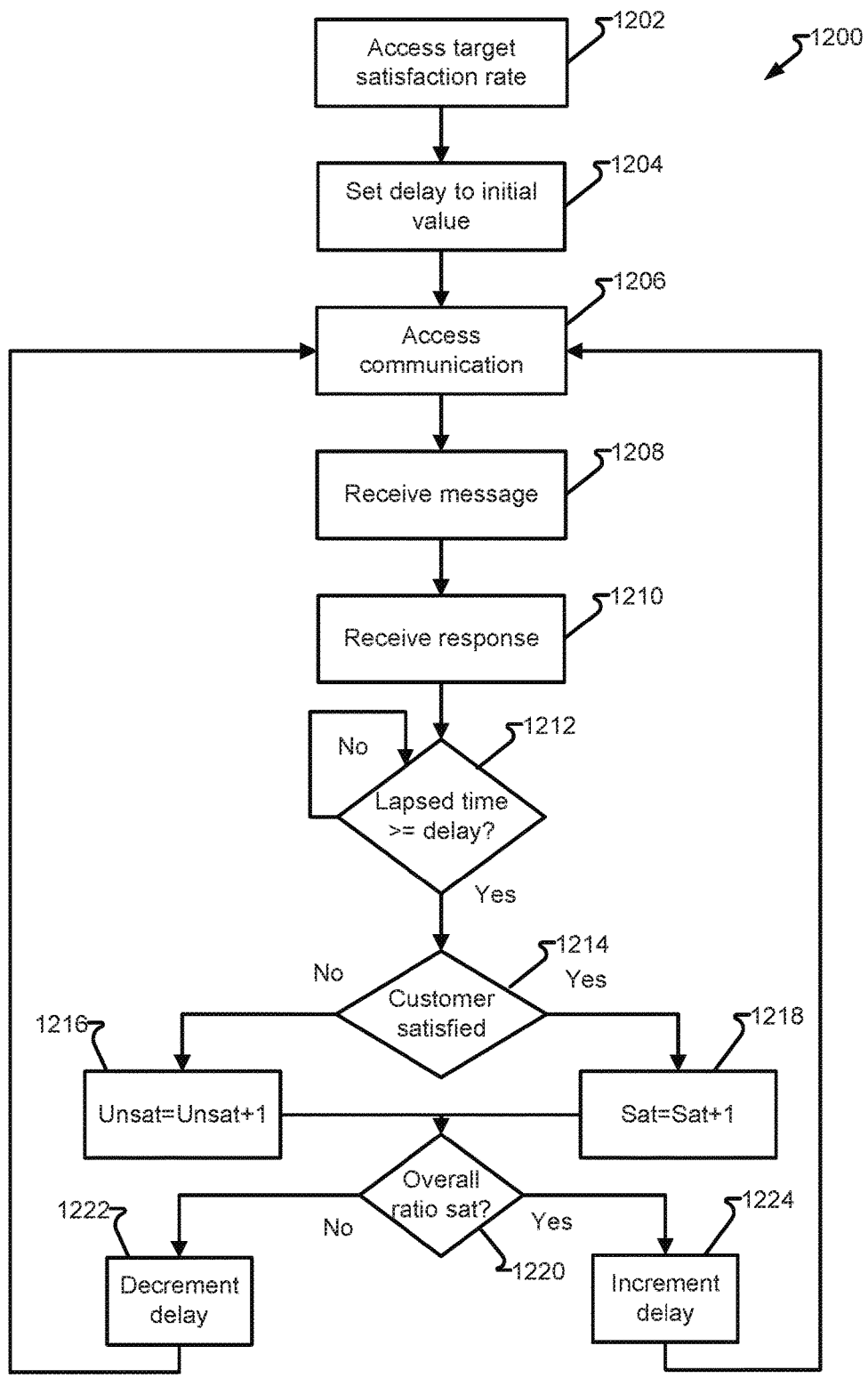
FIG. 12 depicts a fifth process in accordance with embodiments of the present disclosure.

FIG. 12 depicts a process 1200 in accordance with embodiments of the present disclosure. In one embodiment, a target satisfaction rate is accessed in step 1202. Step 1202 may access a previously determined satisfaction rate, obtain a satisfaction rate from a calculation (e.g., average satisfaction rate for a media channel or channels, subject matter, demographic, transaction type, etc.). The satisfaction rate accessed in step 1202 may be determined, in whole or in part, as an objective of contact center 102. The satisfaction rate, as used herein, refers to satisfaction with respect to the delay encountered before the customer receives a reply to their messages and not to satisfaction with the resolution of the work item or another interaction with the agent or contact center. For example, an objective or service level agreement may set the satisfaction rate at 90% for customers who are inquiring about a high-value purchase, 80% for customers who inquiring about a log-value purchase, and 70% for customers following-up on a previous purchase. In another example, the satisfaction rate is set to 80% for all customer. If the resulting delay is then properly set, 80% of future work items will result in 20% of customers being dissatisfied and/or 80% being satisfied. Satisfaction, or lack thereof, may be determined explicitly (e.g., customer survey, customer comment/feedback, etc.) or the lack of dissatisfaction. For example, a customer who inquires "Are you still there?" or "Did that make sense?" is prompting the agent for a response to, at least, obtain a cue that the communication session has not terminated—distinguishing between termination and a lull in the communication is particularly difficult in text-based communications and a motivation to provide customers with responses before they produce additional messages but also balancing the work load of agents who may need to address other work items on text-based and non-text based channels.

Next, step 1204 sets an initial delay value. In one embodiment, step 1204 is a "best guess" as to what delay will comport with the target satisfaction rate accessed in step 1202. In another embodiment, surveys, past observations, and/or other techniques may set the initial delay value in step 1204. Step 1206 then accesses a communication between a customer and an agent. A message of the communication is then accessed, in step 1208. Step 1210 receives a response from an agent to the message received in step 1208. If step 1212 determines the lapsed time, from receipt of the message in step 1208 until the present time, is greater than or equal to the delay set in step 1204, process 1200 continues to step 1214. If step 1212 is determined in the negative, a loop with optional delay is executed until step 1212 is determined in the affirmative.

Step 1214 determines if an indication of satisfaction or dissatisfaction is received. Absence of any indication may be assumed as a satisfaction (or lack of dissatisfaction) with the delay. If step 1214 determines satisfaction in the affirmative, step 1218 may be executed to tally the number satisfied customers, for the delay experienced in a communication or for individual messages, and, if determined in the negative, step 1216 tallies the unsatisfied customers.

Step 1220 determines if the overall ratio observed is equal to, or equal to within a previously determined range, to the target satisfaction rate accessed in step 1202. Preferably a suitably large sample size is utilized although alteration may be performed with a small number of customers or even a single customer. If step 1220 is determined in the positive, the delay may be incremented in step 1224 or, if step 1220 is determined in the negative, the delay may be decremented in step 1222. Process 1200 may be terminated, such as upon obtaining a statistically significant number of observed satisfaction rates, determining that the observed satisfaction rate comports with the target satisfaction rate, and/or other criteria. Until terminated, process 1200, following execution of steps 1222 or 1224, may continue to step 1206 wherein another communication and/or another message is received and subject to a delay and anther observation obtained for the same or a different customer.

Figure 13:
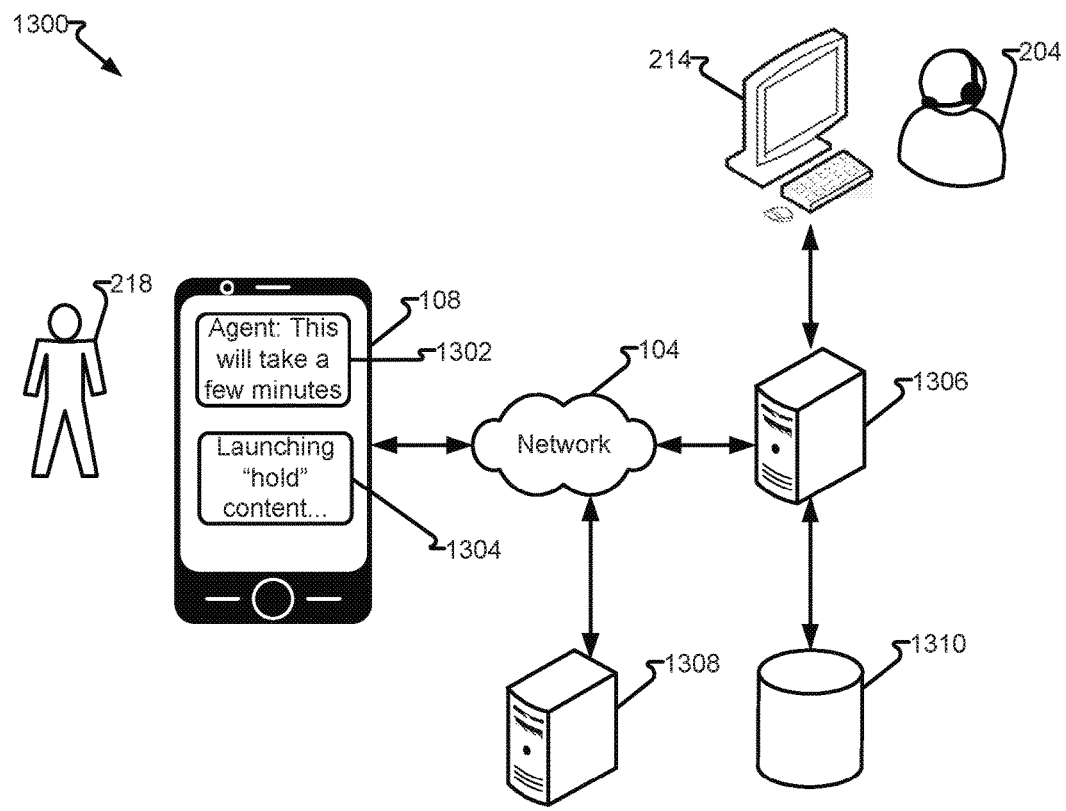
FIG. 13 depicts a fifth system in accordance with embodiments of the present disclosure.

FIG. 13 depicts system 1300 in accordance with embodiments of the present disclosure. In one embodiment, customer 218, utilizing customer communication device 108, is engaged in a communication with agent 204 utilizing agent communication device 214. During the communication, agent 204 requires additional time to perform an action. Rather than simply ignoring customer 218, as is common in the prior art particularly with text-based communications, agent 204 signal server 1306 to place the communication on social media hold allowing customer communication device 108 to present hold content beyond a simple message. For example, social media content may present generic information, including but not limited to news, weather, sports, audio content, video content, games, etc. for a non-specific customer. Additionally, generic content may comprise information related to the contact center and/or other advertising or marketing information. Customized content may include, content related to prior or perspective purchases by customer 218, information that has been determined to be relevant to customer 218 based upon demographic information (e.g., items of interest to people of the same age, gender, occupation, family status, etc. of customer 218) and/or specific information (e.g., stock holdings, account balances, warranty status of a prior purchase, etc., of customer 218).

Content for social media hold may be obtained from database 1310, comprising data, such as data specific to customer 218, data generally relevant to persons having similar demographics as customer 218, data specific to contact center 102, data generally relevant to contact center 102, and/or other information maintained by contact center 102. External data may be accessed via communications network 104 to external sever 1308 which may comprise any one or more data sources for external content (e.g., news, weather, sports, etc.). In another embodiment, social media hold may comprise of games, forms, or other interactive content. For example, customer 218 may be on social media hold and presented with information related to refinancing their home loan, such as when contact center 102 is embodied as a bank or other financial services provider or partner. Customer 218 indicates an interest and begins to fill out a form to determine specifics, qualifications, or other related content associated with obtaining the refinancing their loan. In yet another embodiment, the social media hold may comprise content that does or is reasonably believed to address an issue customer 218 at the root for which customer 218 is interacting with contact center 102. For example, text, audio, and/or video of a frequently asked questions (FAQ) and their associated answers or resolutions. Customer 218 may be prompted to provide input as to the content provided while on social media hold and/or a survey during or after the communication to determine content preferences for customer 218.

In another embodiment, server 1306 may cause customer communication device 108 to present hold notification message 1302. Hold notification message 1302 may present generic information (e.g., "Waiting for agent to return") or more specific information related to the communication (e.g., "The agent should be back in 3:53," "The agent is waiting for an available supervisor to approve the transaction." etc.). In yet another embodiment, hold notification message 1302 may be graphical (e.g., a clock, countdown clock, hourglass, static or animated avatar, etc.). Hold notification message 1302 may also present indicia of steps or acts taken by agent 204 (e.g., checking your account, looking for available flights, etc.), such as may be provided by a workflow application or server utilized by agent 204 and/or by observation of agent 204's actions on agent communication device 214.

In addition, or alternative to hold notification message 1302, server 1306 may cause customer communication device 108 to present social media hold announcement 1304. Social media hold announcement 1304 may launch or prompt customer 218 to launch an application to enable social media content, provided by server 1306, to be provided on customer communication device 108. Optionally, social media hold announcement 1304 may allow customer 218 to accept or decline social media hold content. As a further embodiment, at a later point in time, social media hold announcement 1304 in a modified or unmodified form may afford customer 218 the opportunity to discontinue a previously initiated social media hold content or initiate a social media hold content that was initially declined. Once imitated, customer 218 may be presented with social media hold content provided, directly and/or indirectly, by server 1306. Social media content may be selectable (e.g., games to news, music to stock market information, etc.) or fixed by server 1306.

Figure 14:
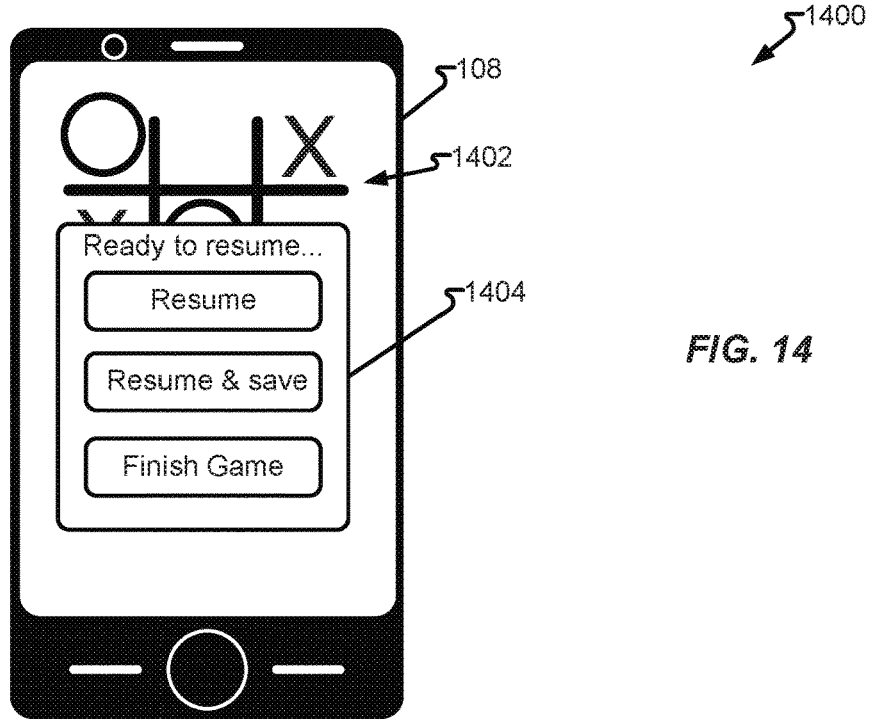
FIG. 14 depicts a second interface in accordance with embodiments of the present disclosure.

FIG. 14 depicts interface 1400 in accordance with embodiments of the present disclosure. In one embodiment, customer 218 is engaged in social media content 1402 (e.g., a game of tic-tac-toe) and off-hold announcement 1404 presented on customer communication device 108. Server 1306 may cause customer communication device 108 to present off-hold announcement in response to an off-hold signal from agent 204 or upon determining agent 204 (or another agent) will resume the communication within a previously determined period of time. For example, agent 204 placed the customer 218 on social media hold to perform an action that is known to contact center 102 to take three minutes and twelve seconds. Accordingly, after three minutes and two seconds have passed, sever 1306 initiates off-hold announcement 1404 and thereby prompts customer 218 to terminate social media content 1402 and rejoin agent 204.

In another embodiment, off-hold announcement 1404 is delayed by server 1306 until social media content 1402 reaches a previously defined break. A previously defined break may be determined, at least in part, by the media. For example, if customer 218 is filling in a text entry field (e.g., address, comment, etc.), completing a level of a game, reading an article or a section of an article, etc., then off-hold announcement 1404 may be delayed until customer 218 has reached the break. Optionally, agent 214 may be notified of the delay and, as a further option, provide agent 214 an indication of the known or estimated time required until customer 218 will reach the break and/or another work item to attend to selected in accord with the known or estimated time required.

In another embodiment, off-hold announcement 1404 may provide options to customer 218, such as to terminate social media content 1402 immediately and resume the communication, resume the communication and save the social media hold session comprising social media content 1402 (e.g., save position in an audio file, game state, partially completed form or field, etc.) to allow customer 218 to resume the social media hold session and social media content 1402 at a later time, such as upon a subsequent hold or upon termination of the communication.

Figure 15:
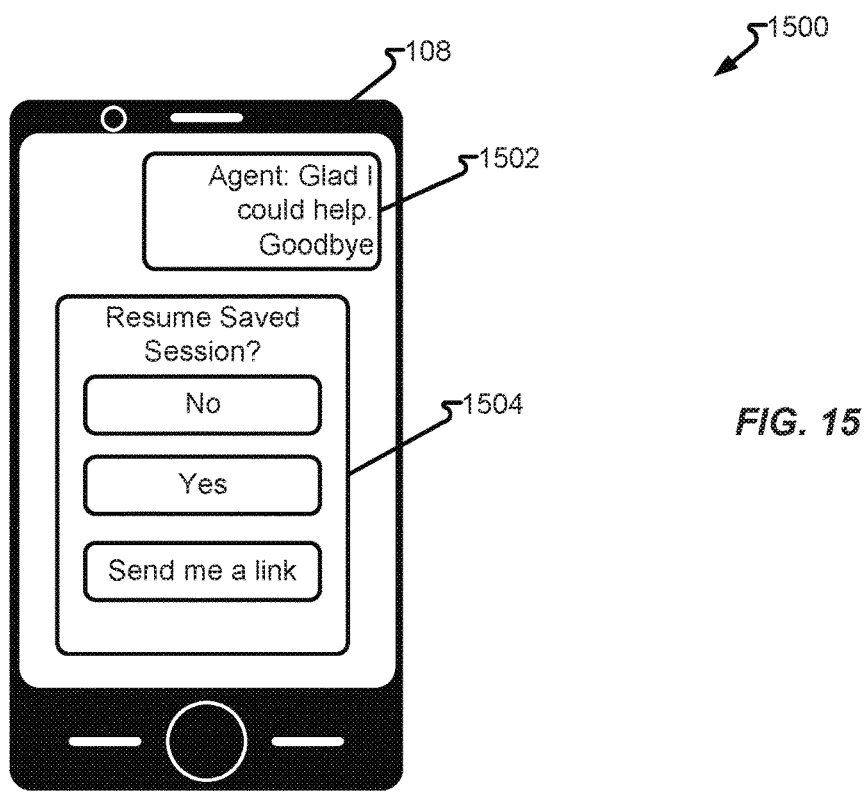
FIG. 15 depicts a third interface in accordance with embodiments of the present disclosure.

FIG. 15 depicts interface 1500 in accordance with embodiments of the present disclosure. In one embodiment, a prior social media session has been saved and communication has terminated with termination message 1502. Upon termination of the communication, resume prompt 1504 is provided on customer communication device 108. Options presented in resume prompt 1504 may include discarding, resuming, and/or obtaining a link to a prior social media session, such as comprising social media content 1402. If discarded, sever 1306 may purge or maintain some or all of social media session and/or social media content 1402. As an option, a subsequent communication may prompt customer 218 to resume a prior saved or discarded social media session. If resume is selected, server 1306 may then access a saved state of the social media session and causes customer communication device 108 to resume presentation of social media content 1402.

In another embodiment, termination message 1502, in response to an input from customer 218, may provide a link or other access to a saved social media session. The link may be provided via text message, email, pre-configured icon, and/or other means to embed or present an HTML or other link. Accordingly, customer 218 may then resume social media session on customer communication device 108 or, via the provided link, upon another device. Then, at a subsequent time, server 1306 and/or other server resumes presentation of the social media session.

Figure 16:
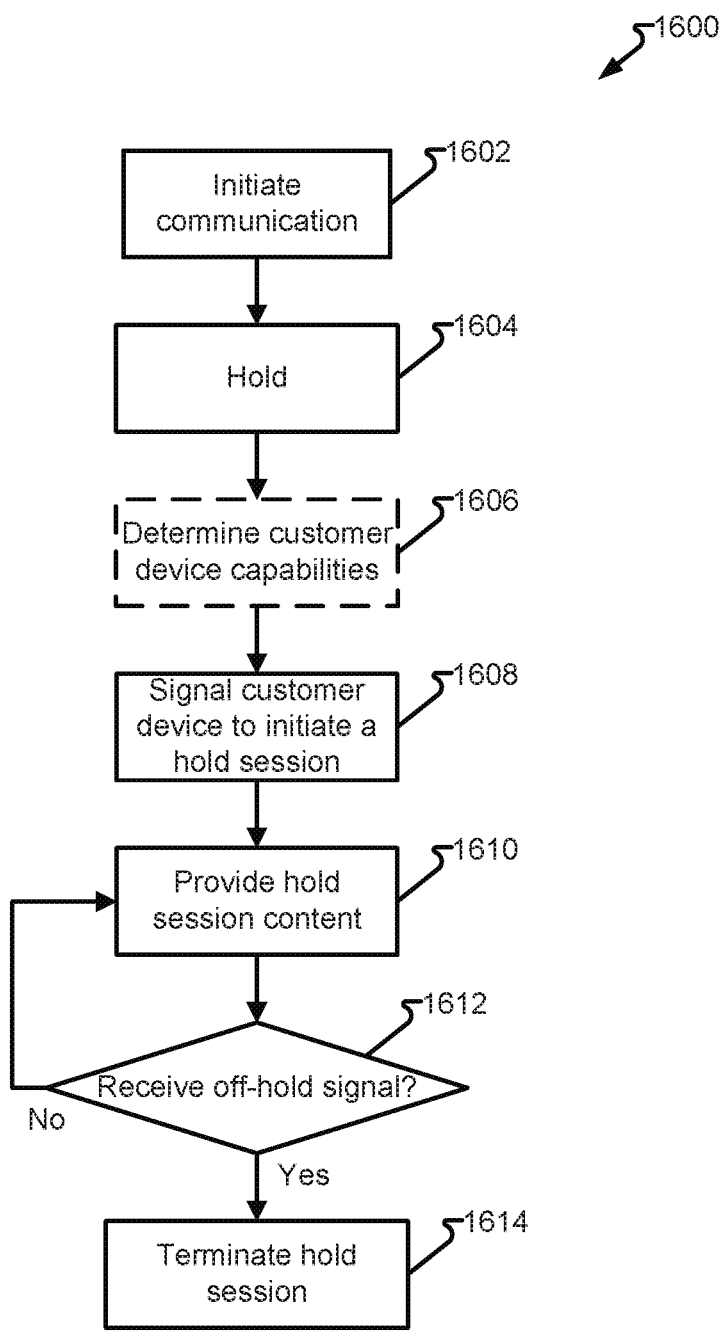
FIG. 16 depicts a sixth process in accordance with embodiments of the present disclosure.

FIG. 16 depicts process 1600 in accordance with embodiments of the present disclosure. In one embodiment, step 1602 imitates a communication between a customer, such as customer 218 and an agent, such as agent 204. While certain advantages are realized when agent 214 comprises a human agent, advantages are still realized when agent 214 is an automated agent, such as agent 202. The agent places the communication on hold at step 1602 and, optionally, step 1606 determines the capabilities of the customer communication device being utilized for the communication, such as one of customer communication device 108. As a benefit, social media content provided by the contact center, such as by server 1306, may be limited to only the type of content presentable by the particular customer communication device being utilized for the communication initiated in step 1602.

Step 1608 signals the customer, such as by presentation of hold announcement 1304, that the communication is being put on hold. Step 1610 initiates the social media hold session and content, such as social media content 1402. Step 1612 determines if an off-hold signal has been received and, if no, process 1600 may resume presenting the social media session in step 1610. Upon step 1612 being determined in the affirmative, step 1614 is executed, such as to terminate the social media session initiated/maintained in step 1610 or to prompt a customer, such as customer 212 to terminate/pause the social media session or social media content.

Figure 17:
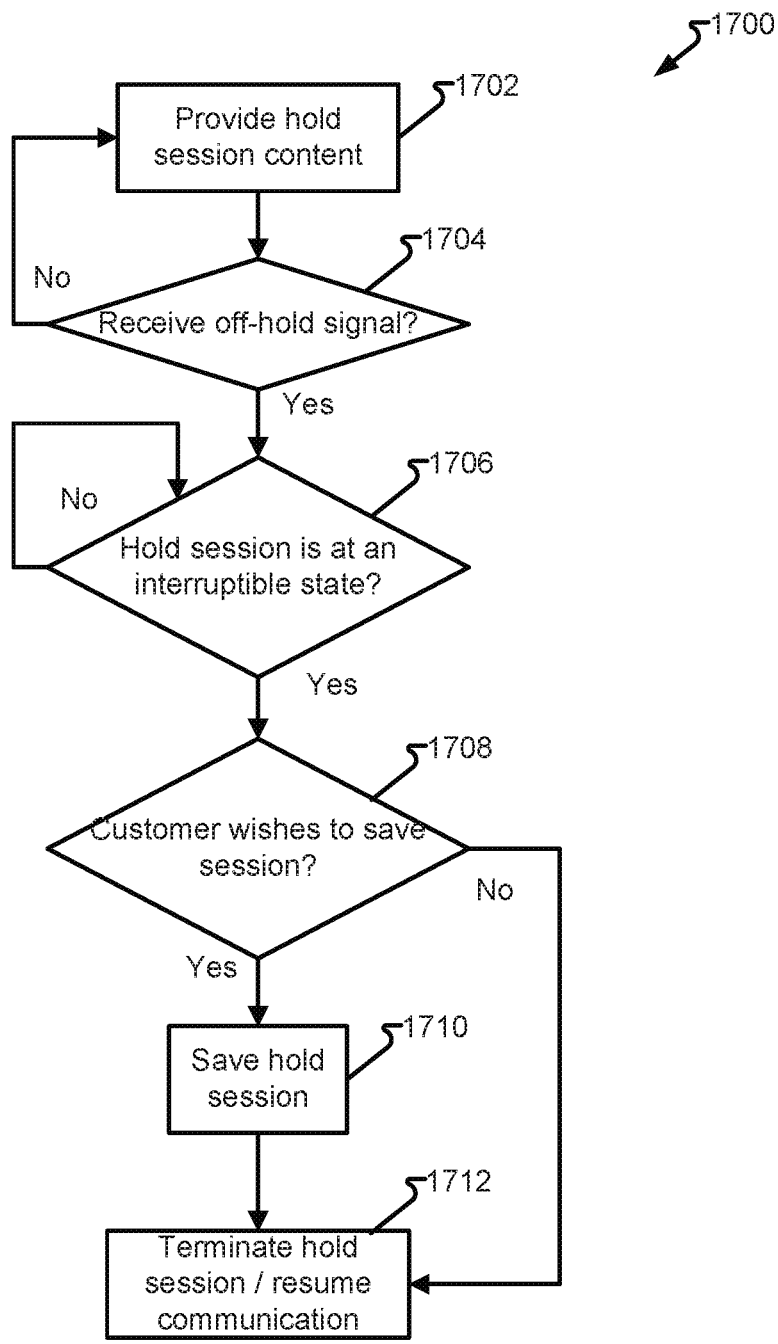
FIG. 17 depicts a seventh process in accordance with embodiments of the present disclosure.

FIG. 17 depicts process 1700 in accordance with embodiments of the present disclosure. In one embodiment, a communication between a customer, such as customer 212 and an agent, such as agent 202, has been paused due to the customer being placed on social media hold. Social media hold session content is provided in step 1702 and step 1704 determines whether an off-hold signal has been received. If step 1704 is determined in the negative, process 1700 loops back to step 1702 and maintains the social media session until such time as step 1704 is determined in the affirmative.

Step 1706 may be executed to determine whether the social media session is at a break or other interruptible state. As described more fully with respect to FIG. 14, an interruptible state or break may comprise submission of a form or text entry, completion of a level of a game, completing an article, ending of a media file, etc., and/or other portion of a social media content determined to be a break. If step 1706 is determined in the negative, process 1700 may loop until such time as step 1706 is determined in the positive. As an option, an off-hold announcement may be delayed until step 1706 is determined in the affirmative.

Step 1708 may receive a response from the customer to save or discard the social media session and, if determined in the negative, step 1712 may terminate the social media hold session and resume the communication. If step 1708 is determined in the affirmative, step 1710 is executed whereby the social media session is saved, such as by server 1306 utilizing storage 1310 and/or other server/storage.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (e.g., GPU, CPU), or logic circuits programmed with the instructions to perform the methods (e.g., FPGA). A processor may further comprise a plurality of processor components, each performing a particular processing task or sharing processing tasks. For example, a processor may comprise a processing system wherein one processor resides on a customer device, such as customer communication device 108 and another processor resides on at least one server, such as within contact center 102.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a storage device; and
a processor to:
access a communication between a customer of a contact center and a first agent of the contact center, wherein the communication is associated with a work item of the contact center, and wherein the communication comprises a plurality of messages;
identify at least one of the plurality of message as a comfort message devoid of content related to the work item, the comfort message having been inserted into the communication by a component of the contact center, and wherein the comfort message is provided to the customer; and
cause the data storage device to maintain a transcription of the communication absent the comfort message.

2. The system of claim 1, further comprising:
a display device associated with a second agent; and
wherein the work item is transferred to the second agent, the display device presents the transcription of the communication absent the comfort message.

3. The system of claim 1, wherein the processor causes the data storage device to maintain the transcription of the communication absent the comfort message, further comprising:
the processor causes the data storage device to store the transcription of the communication including the comfort message; and
the processor, upon determining the comfort message is older than a previously determined age, causes the data storage device to remove the comfort message.

4. The system of claim 1, wherein the processor causes the storage device to maintain indicia of the comfort message.

5. The system of claim 4, wherein the processor causes the storage device to maintain indicia of the comfort message separately from the transcription.

6. The system of claim 1, wherein the first agent is an automated agent.

7. The system of claim 1, wherein the processor, upon determining the first agent has been silent on the communication for longer than a previously determined threshold, causes the comfort message to be automatically inserted into the communication.

8. The system of claim 7, wherein the processor, upon determining the first agent has been silent on the communication for longer than a previously determined threshold, prompts the first agent to insert the comfort message into the communication.

9. The system of claim 1, wherein the processor identifies the at least one of the plurality of messages as the comfort message, upon determining the first agent set an indicator of a comfort message associated with the at least one of the plurality of messages.

10. The system of claim 1, wherein the processor identifies the at least one of the plurality of messages as the comfort message, upon determining content of the at least one of the plurality of messages is devoid of content within a domain associated with the work item.

11. The system of claim 1, wherein the plurality of messages comprises textual messages.

12. A method comprising:
accessing, by a processor, a communication between a customer of a contact center and a first agent of the contact center, wherein the communication is associated with a work item of the contact center, and wherein the communication comprises a plurality of messages;
identifying, by the processor, at least one of the plurality of messages as a comfort message devoid of content related to the work item, the comfort message having been inserted into the communication by a component of the contact center, and wherein the comfort message is provided to the customer; and
causing, by the processor, the data storage device to maintain a transcription of the communication absent the comfort message.

13. The method of claim 12, further comprising:
transferring the work time from the first agent to a second agent; and
presenting, on a display device associated with the second agent, the transcription of the communication absent the comfort message.

14. The method of claim 12, wherein causing the data storage device to maintain the transcription of the communication absent the comfort message, further comprising:
causing, by the processor, the data storage device to store the transcription of the communication including the comfort message; and
upon determining the comfort message is older than a previously determined age, causing, by the processor, the data storage device to remove the comfort message.

15. The method of claim 12, further comprising causing, by the processor, the storage device to maintain indicia of the comfort message.

16. The method of claim 12, further comprising, upon determining the first agent has been silent on the communication for longer than a previously determined threshold, causing, by the processor, the comfort message to be automatically inserted into the communication.

17. The method of claim 12, wherein identifying the at least one of the plurality of messages as the comfort message, further comprises, identifying, by the processor, the at least one of the plurality of messages is devoid of content within a domain associated with the work item.

18. A system, comprising:
means to access, by a processor, a communication between a customer of a contact center and a first agent of the contact center, wherein the communication is associated with a work item of the contact center, and wherein the communication comprises a plurality of messages;
means to identify, by a processor, at least one of the plurality of messages as a comfort message devoid of content related to the work item, the comfort message having been inserted into the communication by a component of the contact center, and wherein the comfort message is provided to the customer; and
means to cause, by the processor, the data storage device to maintain a transcription of the communication absent the comfort message.

19. The system of claim 18, further comprising:
upon determining the first agent has been silent on the communication for longer than a previously determined threshold, means to causes the comfort message to be automatically inserted into the communication.

20. The system of claim 12, the means to cause the data storage device to maintain the transcription of the communication absent the comfort message, further comprise:
means to cause the data storage device to store the transcription of the communication including the comfort message; and
upon determining the comfort message is older than a previously determined age, causing, by the processor, means to cause the data storage device to remove the comfort message.

* * * * *